US011851184B2

(12) United States Patent
Needham

(10) Patent No.: US 11,851,184 B2
(45) Date of Patent: Dec. 26, 2023

(54) SYSTEMS AND METHODS TO CONTROL AERIAL DISTRIBUTION OF MATERIALS

(71) Applicant: Capstan Ag Systems, Inc., Topeka, KS (US)

(72) Inventor: Duane Needham, Berkeley, CA (US)

(73) Assignee: Capstan Ag Systems, Inc., Topeka, KS (US)

(*) Notice: Subject to any disclaimer, the term of this patent is extended or adjusted under 35 U.S.C. 154(b) by 0 days.

(21) Appl. No.: 17/647,843

(22) Filed: Jan. 12, 2022

(65) Prior Publication Data

US 2022/0135225 A1 May 5, 2022

Related U.S. Application Data

(63) Continuation of application No. 15/968,883, filed on May 2, 2018, now Pat. No. 11,247,777.

(60) Provisional application No. 62/500,868, filed on May 3, 2017.

(51) Int. Cl.

| | |
|---|---|
| ***B64D 1/18*** | (2006.01) |
| ***B05B 1/16*** | (2006.01) |
| ***B05B 13/00*** | (2006.01) |
| ***B05B 15/14*** | (2018.01) |
| *B05B 1/20* | (2006.01) |
| *B05B 1/08* | (2006.01) |
| *B05B 1/30* | (2006.01) |
| *B05B 12/04* | (2006.01) |

(52) U.S. Cl.

CPC .................. *B64D 1/18* (2013.01); *B05B 1/16* (2013.01); *B05B 13/005* (2013.01); *B05B 15/14* (2018.02); *B05B 1/083* (2013.01); *B05B 1/20* (2013.01); *B05B 1/3053* (2013.01); *B05B 12/04* (2013.01)

(58) Field of Classification Search

CPC .. B64D 1/16; B64D 1/18; B64D 1/083; B05B 1/16; B05B 1/20; B05B 1/13; B05B 1/3053; B05B 15/14; B05B 12/04; B05B 13/005; B05B 12/082; B05B 12/004; B05B 12/008; A01B 79/005; A01B 79/02

See application file for complete search history.

(56) References Cited

U.S. PATENT DOCUMENTS

| | | | |
|---|---|---|---|
| 3,204,895 | A | 9/1965 | Razak |
| 3,455,511 | A | 7/1969 | Fedorenko |
| 4,560,107 | A | 12/1985 | Inculet |
| 5,025,988 | A | 6/1991 | Lund |
| 5,137,233 | A | 8/1992 | Maimon et al. |
| 5,334,987 | A | 8/1994 | Teach |
| 5,653,389 | A | 8/1997 | Henderson et al. |
| 5,704,546 | A | 1/1998 | Henderson et al. |

(Continued)

*Primary Examiner* — Christopher R Dandridge

(74) *Attorney, Agent, or Firm* — Armstrong Teasdale LLP

(57) ABSTRACT

A method for emitting a fluid from an aerial fluid dispersal system includes emitting the fluid from a plurality of individually controlled nozzle assemblies distributed across a manifold assembly. The method also includes receiving, at a controller, an input associated with a desired droplet size of the fluid emitted from each respective nozzle assembly and determining, by the controller, a target differential fluid velocity for each respective nozzle assembly based on the desired droplet size. The method also includes regulating, using the controller, the velocity of the fluid exiting each respective nozzle assembly to produce the target differential fluid velocity from each respective nozzle assembly.

20 Claims, 21 Drawing Sheets

(56) References Cited

U.S. PATENT DOCUMENTS

| | | | | |
|---|---|---|---|---|
| 7,735,752 | B1 | 6/2010 | Songer et al. | |
| 2006/0273189 | A1 | 12/2006 | Grimm et al. | |
| 2010/0032492 | A1* | 2/2010 | Grimm | A01M 7/0089 239/76 |
| 2014/0259897 | A1* | 9/2014 | Godbole | A01C 21/002 47/1.5 |
| 2016/0015020 | A1 | 1/2016 | Needham et al. | |
| 2016/0175869 | A1* | 6/2016 | Sullivan | B05B 1/20 239/11 |
| 2017/0114922 | A1 | 4/2017 | Kroes | |
| 2018/0099747 | A1 | 4/2018 | Peng et al. | |

* cited by examiner

```
                                        ┌─ 1100
                                  ┌─ 1102
┌─────────────────────────────────────┐
│   EMITTING FLUID FROM A PLURALITY OF │
│   INDIVIDUALLY CONTROLLED NOZZLES    │
│   DISTRIBUTED ACROSS A MANIFOLD      │
│              ASSEMBLY                │
└─────────────────────────────────────┘
                  │
                  ▼            ┌─ 1104
┌─────────────────────────────────────┐
│  RECEIVING, AT A CONTROLLER, AN INPUT│
│  ASSOCIATED WITH A DESIRED DROPLET   │
│  SIZE OF THE FLUID EMITTED FROM EACH │
│         RESPECTIVE NOZZLE            │
└─────────────────────────────────────┘
                  │
                  ▼            ┌─ 1106
┌─────────────────────────────────────┐
│   DETERMINING, BY THE CONTROLLER, A  │
│  DIFFERENTIAL FLUID VELOCITY FOR EACH│
│   RESPECTIVE NOZZLE BASED ON THE     │
│         DESIRED DROPLET SIZE         │
└─────────────────────────────────────┘
                  │
                  ▼            ┌─ 1108
┌─────────────────────────────────────┐
│ REGULATING, USING THE CONTROLLER, THE│
│  VELOCITY OF THE FLUID THROUGH EACH  │
│  RESPECTIVE NOZZLE TO PRODUCE THE    │
│     DIFFERENTIAL FLUID VELOCITY      │
└─────────────────────────────────────┘
```

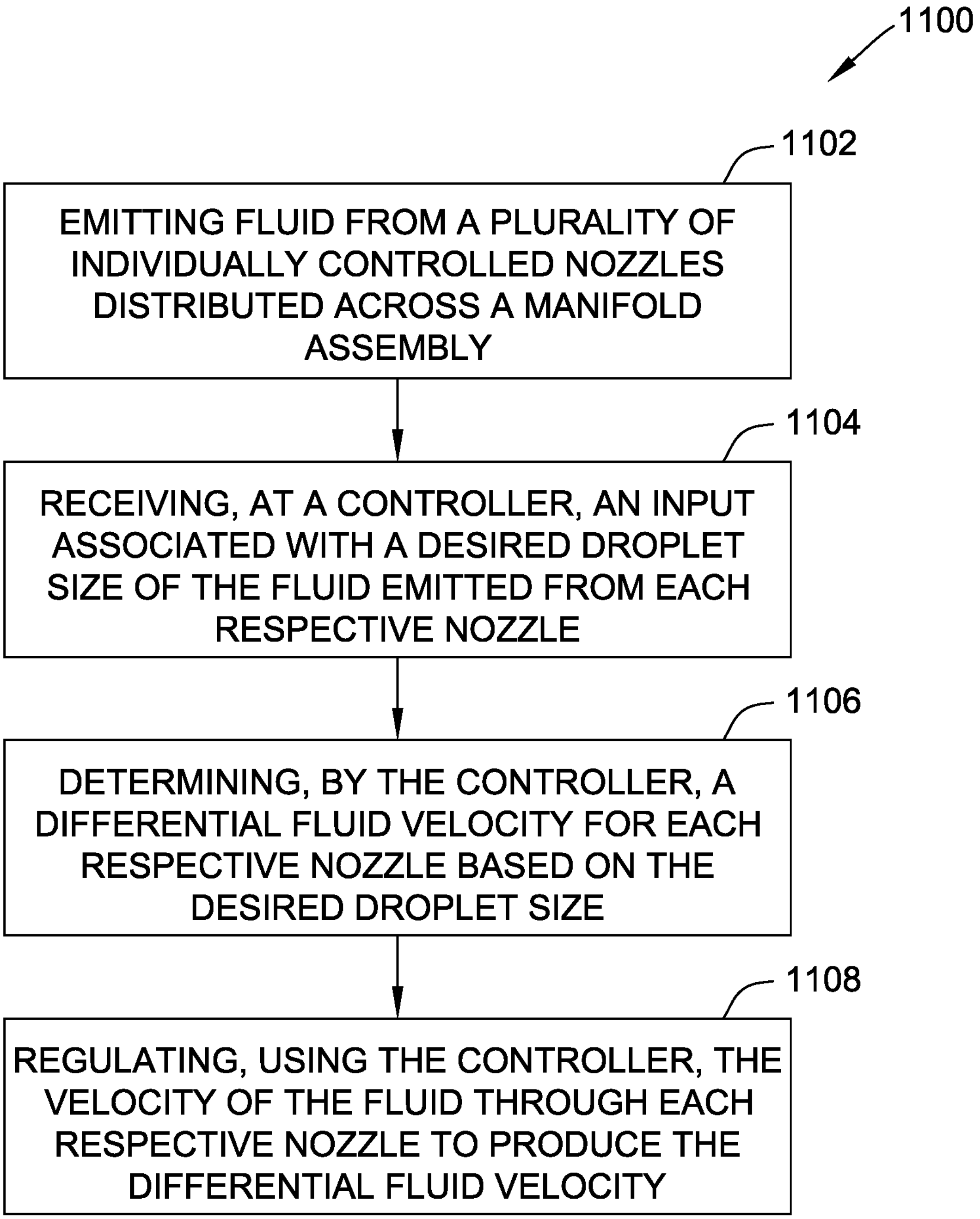

FIG. 11

```
                              ┌─ 1400
                              │
                          ┌─ 1402
┌─────────────────────────────────────┐
│  DIVIDE A DISTRIBUTION PROFILE INTO │
│         A PLURALITY OF SECTIONS     │
└─────────────────────────────────────┘
                 │
                 ▼            ┌─ 1404
┌─────────────────────────────────────┐
│  IDENTIFY A SECTION OF THE PLURALITY│
│  OF SECTIONS OF THE DISTRIBUTION    │
│  PROFILE                            │
└─────────────────────────────────────┘
                 │
                 ▼            ┌─ 1406
┌─────────────────────────────────────┐
│  IDENTIFY A NOZZLE ASSEMBLY OF A    │
│  PLURALITY OF NOZZLE ASSEMBLIES     │
│  CONFIGURED TO EMIT FLUID ACROSS    │
│  THE DISTRIBUTION PROFILE           │
└─────────────────────────────────────┘
                 │
                 ▼            ┌─ 1408
┌─────────────────────────────────────┐
│  IDENTIFY A RANGE OF DROPLET SIZES  │
│  OF THE FLUID EMITTED FROM THE      │
│  NOZZLE ASSEMBLY                    │
└─────────────────────────────────────┘
                 │
                 ▼            ┌─ 1410
┌─────────────────────────────────────┐
│  DETERMINE A DISTRIBUTION SPREAD    │
│  FOR THE RANGE OF DROPLET SIZES     │
│  BASED ON A POSITION OF THE         │
│  NOZZLE ASSEMLBY                    │
└─────────────────────────────────────┘
                 │
                 ▼            ┌─ 1412
┌─────────────────────────────────────┐
│  DETERMINE, FOR THE RANGE OF        │
│  DROPLET SIZES, A CALCULATED        │
│  VOLUMETRIC DEPOSITION IN THE       │
│  SECTION BASED ON THE DISTRIBUTION  │
│  SPREAD AND THE PORTION OF FLUID    │
│  FLOW THAT IS EMITTED FROM THE      │
│  NOZZLE ASSEMBLY WITH DROPLET       │
│  SIZES WITHIN THE RANGE OF          │
│  DROPLET SIZES                      │
└─────────────────────────────────────┘
                 │
                 ▼
                (A)
```

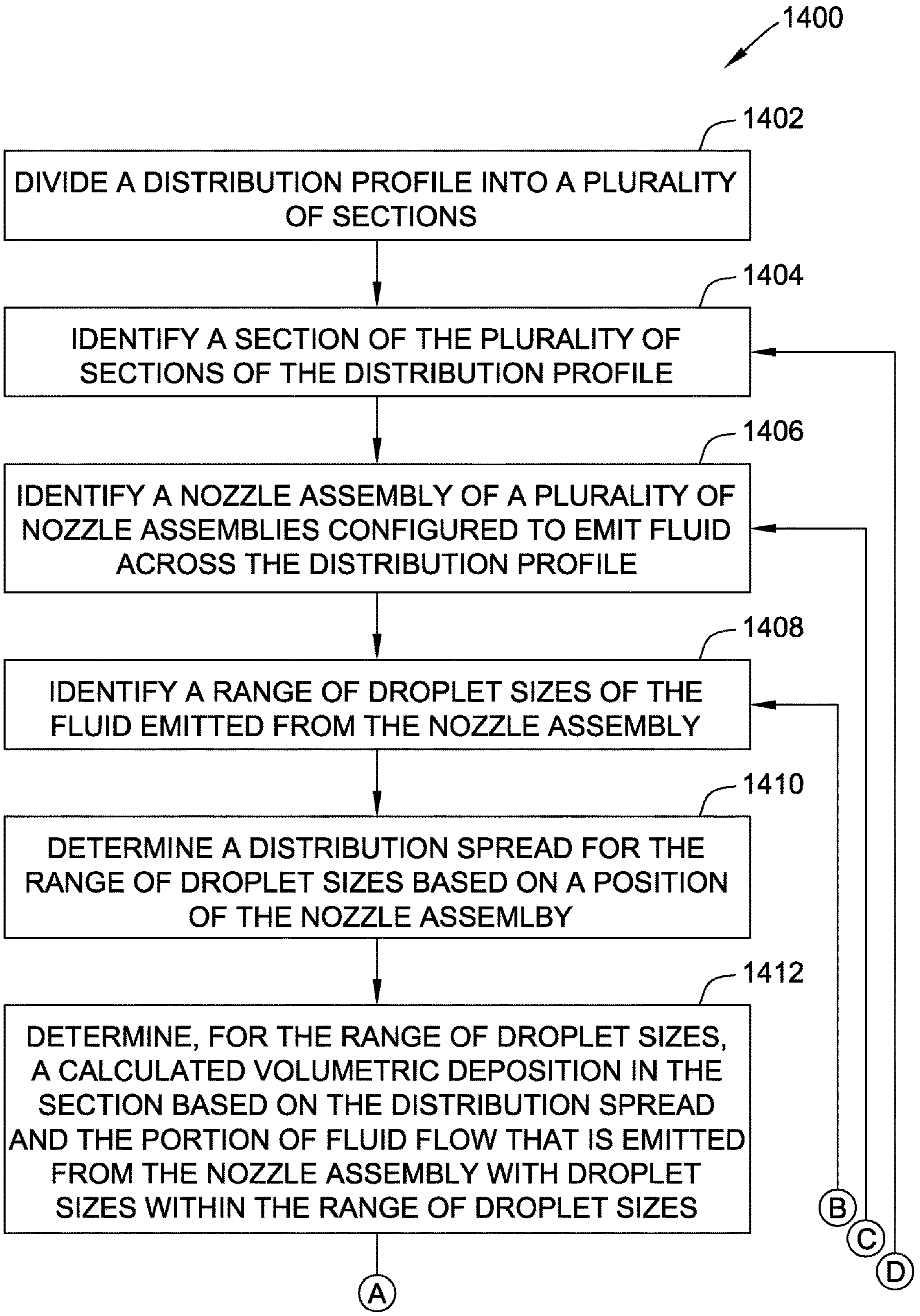

FIG. 17A

SYSTEMS AND METHODS TO CONTROL AERIAL DISTRIBUTION OF MATERIALS

CROSS-REFERENCE TO RELATED APPLICATION

This application is a continuation of U.S. patent application Ser. No. 15/968,883, filed on May 2, 2018, which claims priority to U.S. Provisional Patent Application Ser. No. 62/500,868, filed on May 3, 2017, the disclosures of which are hereby incorporated by reference in their entirety.

BACKGROUND

The present disclosure relates generally to fluid dispersal systems, and particularly, to control systems for use with aerial fluid dispersal systems and methods of controlling aerial fluid dispersal systems.

Aerial spraying is a well-known method of applying a wide variety of bulk materials, primarily in liquid form or a mixture of liquid and powder in a fluid propellant medium. Such spray materials can be dispensed in air currents, under liquid pressure, by gravity flow, or with any other suitable discharge means. Aerial spray application of bulk materials may offer a variety of potential advantages, including efficiency, uniformity of coverage, and flexibility to adapt spraying equipment to various conditions unique to the objects being sprayed and their particular environments.

Aerial agricultural spraying, however, is typically a relatively inefficient process. Factors which contribute to such inefficiencies include the susceptibility of sprayed materials to wind drift, overspray, and inaccurate placement on the intended target. Variations in ambient conditions such as wind, humidity levels, and temperature tend to reduce the uniformity and efficiency with which spray materials are applied to their intended targets. In particular, the non-uniformity with which spray materials are applied may in some cases be exacerbated by aerial spraying. However, the inherent difficulties associated with large-scale spraying operations may be balanced against the relative efficiencies which are achieved by covering larger areas more rapidly with wide-swath spraying equipment.

The high vehicle speed associated with aerial spraying results in wind shear on the bulk material stream, which may result in decreased droplet size spectra and increased wind drift. In addition, the air speeds across an aerial vehicle vary significantly. This is due in part to vortices generated by the wing tips and fuselage and increased air speeds behind the propeller. A common technique for addressing the non-uniformity of the distribution of the spray materials includes altering a position of the nozzles on the aerial spray apparatus and/or increasing or decreasing a number of nozzles in use. However, altering the nozzle position does not fully account for the different air speed velocities at each nozzle, which alters a droplet size of the spray, thus effecting the deposition and its susceptibility to spray drift, evaporation, and other factors.

Accordingly, an aerial spray system that is capable of controlling the application rate and distribution profile of the spray liquid, and/or maintaining a consistent droplet size spectrum across the spray swath is particularly useful.

BRIEF DESCRIPTION

In one aspect, a method for emitting a fluid from a fluid dispersal system is provided. The method includes emitting the fluid from a plurality of individually controlled nozzle assemblies distributed across a manifold assembly. The fluid emitted from each respective nozzle assembly has droplet size based on a differential fluid velocity between the relative air speed of the respective nozzle assembly and a velocity of the fluid exiting the respective nozzle assembly. The method also includes receiving, at a controller, an input associated with a desired droplet size of the fluid emitted from each respective nozzle assembly, or grouped set of nozzle assemblies, and determining, by the controller, a target differential fluid velocity for each respective nozzle assembly based on the desired droplet size. Moreover, the method includes regulating, using the controller, the velocity of the fluid through each respective nozzle assembly to produce the target differential fluid velocity from each respective nozzle assembly.

In another aspect, an aerial fluid dispersal system includes a fluid reservoir configured to hold a quantity of fluid. The system also includes a manifold assembly in fluid communication with the fluid reservoir and a fluid pump coupled in fluid communication with the fluid reservoir and the manifold assembly for generating a flow of pressurized fluid in the manifold assembly. The system further includes a plurality of individually controlled nozzle assemblies coupled in fluid communication with the manifold assembly. Each respective nozzle assembly of the plurality of individually controlled nozzle assemblies is configured to emit the pressurized fluid. The fluid emitted from each respective nozzle assembly having a droplet size based on a differential fluid velocity between a relative air speed of the respective nozzle assembly and a velocity of the fluid exiting the respective nozzle assembly. The system also includes a controller coupled to the fluid pump and the plurality of individually controlled nozzle assemblies. The controller is configured to receive an input associated with a desired droplet size of the fluid emitted from each respective nozzle assembly, determine a target differential fluid velocity for each respective nozzle assembly based on the desired droplet size, and regulate the velocity of the fluid through each respective nozzle assembly to produce the target differential fluid velocity from each respective nozzle assembly.

These and other features, aspects, and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

FIG. 11 is a flow chart of an example method for emitting the fluid from the fluid dispersal system shown in FIG. 1, and having a predetermined droplet size;

FIGS. 17A and 17B illustrate a flow chart of an example method for determining a deposition amount of fluid emitted from the fluid dispersal system shown in FIG. 1;

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Figure 1:
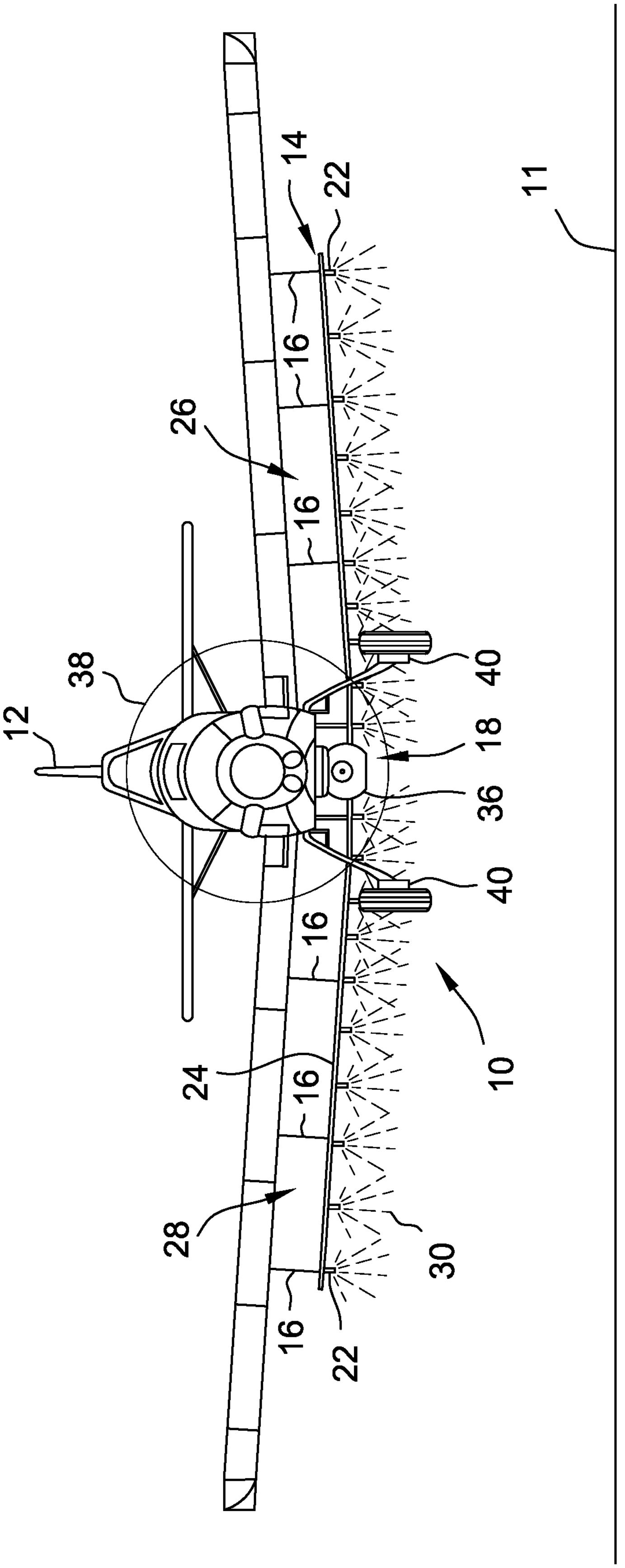
FIG. 1 is a front view of an example fluid dispersal system coupled to an aerial vehicle.
Figure 2:
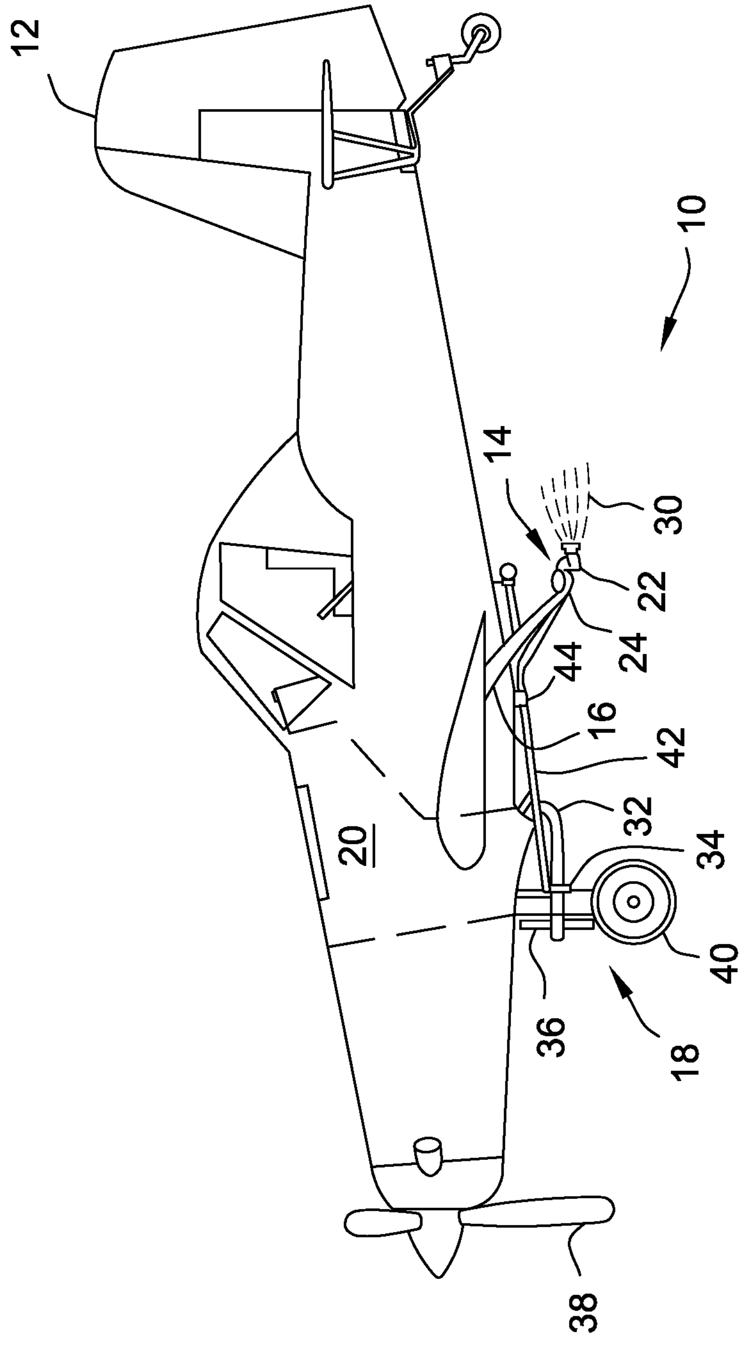
FIG. 2 is a side view of the fluid dispersal system coupled to the aerial vehicle.
Figure 3:
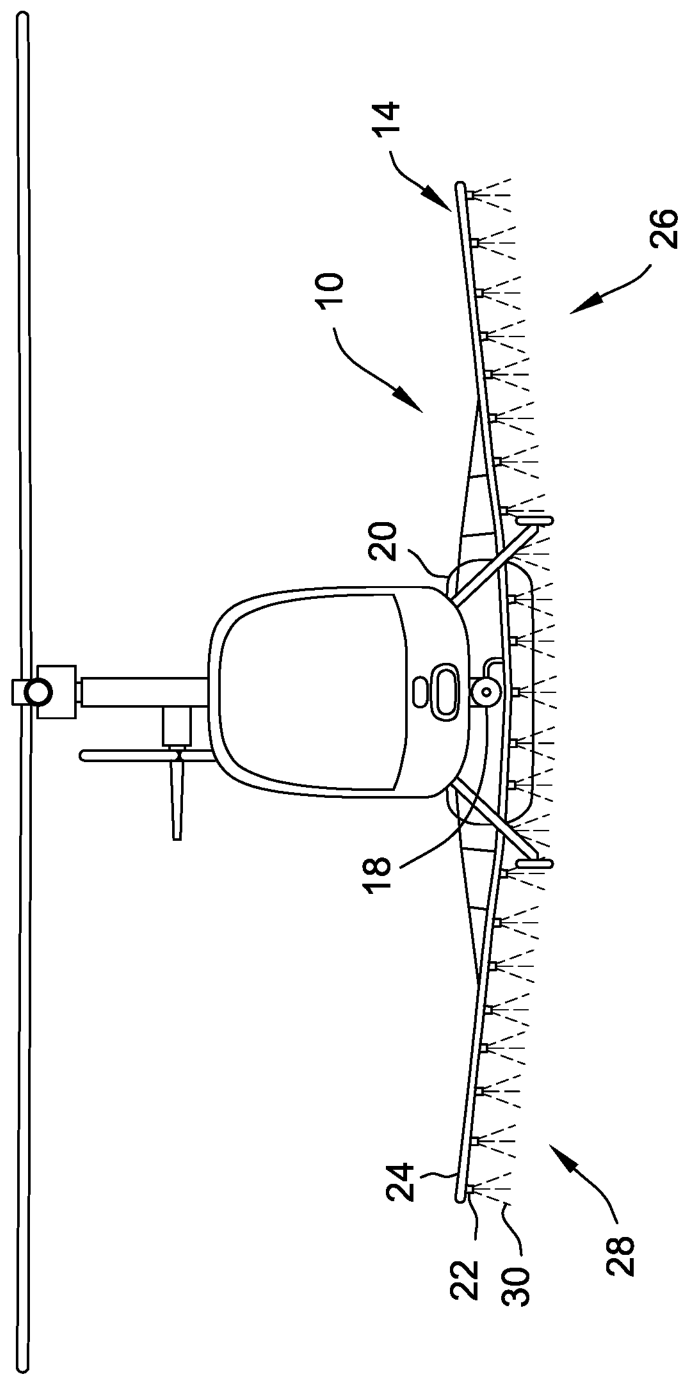
FIG. 3 is a front view of an example rotary aerial vehicle that can be used in combination with the fluid dispersal system shown in FIG. 1.

FIG. 1 is a front view of an example fluid dispersal system 10 coupled to an aerial vehicle 12. FIG. 2 is a side view of fluid dispersal system 10 coupled to aerial vehicle 12. In the example embodiment, aerial vehicle 12 is a conventional fixed-wing airplane used for aerial application of materials, such as powdered or liquid insecticide or fertilizer, onto crops from the air. Although aerial vehicle 12 is shown as a low-wing airplane, aerial vehicle 12 may be any type of airplane suitable for aerial application of materials onto crops, including for example, and without limitation, high-wing monoplanes, biplanes, and the like. For example, FIG. 3 is a front view of an example rotary aerial vehicle 13 that can be used in combination with fluid dispersal system 10. In some embodiments, aerial vehicle 12 may be a drone or other unmanned aerial vehicle 12.

In addition, fluid dispersal system 10 is not limited to use with aerial vehicle 12. For example, in some embodiments, fluid dispersal system 10 may be coupled to a vehicle configured to move fluid dispersal system 10 along the ground 11. In further embodiments, fluid dispersal system 10 may be self-propelled and/or configured to operate at a fixed location.

Referring back to FIGS. 1 and 2, in the example embodiment, aerial vehicle 12 and/or fluid dispersal system 10 may include a global positioning system (e.g., a GPS receiver) for providing location and velocity information related to aerial vehicle 12 and/or fluid dispersal system 10, and/or automated control of aerial vehicle 12 and/or fluid dispersal system 10. In some embodiments, the global positioning system is used to monitor, for example, and without limitation, a speed, a height, a position, a travel direction, an ascent or descent, etc. of vehicle 12 and/or fluid dispersal system 10.

In the example embodiment, fluid dispersal system 10 is coupled to and/or integrated with aerial vehicle 12. Fluid dispersal system 10 includes a boom assembly 14 coupled to aerial vehicle 12 by one or more hangers 16, a pump assembly 18, and a fluid reservoir 20. In the example embodiment, fluid reservoir 20 is enclosed within aerial vehicle 12. Alternatively, fluid reservoir 20 can be an external fluid reservoir coupled to a portion of the aerial vehicle. For example, as shown in FIG. 3, fluid reservoir 20 may be coupled to the external portion of rotary aerial vehicle 13. Referring back to FIGS. 1 and 2, in the example embodiment, boom assembly 14 includes a plurality of nozzle assemblies 22 coupled to a manifold assembly or boom pipe 24. Nozzle assemblies 22 are coupled in flow communication with fluid reservoir 20 through boom pipe 24. Boom pipe 24 may include, for example, a left boom section 26 and a right boom section 28. In one embodiment, boom sections 26 and 28 may be defined by sets or banks of nozzle assemblies 22 defined by a programmable map loaded into a controller 60 (shown in FIG. 8). Furthermore, in some embodiments, the boom sections include any number in which nozzle assemblies 22 corresponding to such boom sections are controlled as a set or individually by controller 60.

Further, in the example embodiment, fluid reservoir 20 holds a quantity of material 30, such as, and without limitation, a liquid, a mixture of liquid and powder, and/or other material, to be dispensed by fluid dispersal system 10, for example, onto a crop. In some embodiments, material 30 may be water or an agrochemical such as an herbicide or a pesticide, and may be dispensed by nozzle assemblies 22 onto, for example, the crop and/or the ground. The quantity of material 30 held in fluid reservoir 20 generally flows through boom pipe 24 to nozzle assemblies 22. More specifically, pump assembly 18 is configured to selectively draw a flow of material 30 from reservoir 20 through an inlet conduit 32 and pressurize the flow of material 30. The terms “pipe” and “conduit,” as used herein, include any type of tube made of any suitable material such as metal, rubber, or plastic, for channeling material 30 therethrough.

Pump assembly 18 includes, for example, and without limitation, a centrifugal pump 34 driven by a fan 36 positioned in the slipstream of a propeller 38 of aerial vehicle 12. For example, as shown in FIG. 1, pump assembly 18 is mounted to aerial vehicle 12 between the landing gear 40. In alternative embodiments, pump assembly 18 is any type of pump, such as, and without limitation, a hydraulic drive pump and/or an electrically operated pump, that enables fluid dispersal system 10 to function as described herein. For example, in some embodiments, pump assembly 18 is a high pressure pump capable of pressurizing material 30 to pressures in the range between about 100 pounds per square inch (psi.) and about 400 psi. In other examples, pump assembly 18 may include more than one pump coupled in serial arrangement to facilitate increasing the pressure of material 30. In the example embodiment, pump assembly 18 is mounted to aerial vehicle 12 below reservoir 20 to facilitate the pump assembly 18 continuously receiving material 30 from reservoir 20, i.e., to ensure pump assembly 18 remains primed.

Pump assembly 18 provides the pressurized flow of material 30 to boom pipe 24 through an outlet conduit 42. Pressurized material 30 flows through boom pipe 24 to nozzle assemblies 22, where it is dispersed into the air. In certain embodiments, outlet conduit 42 includes a metering device 44, such as a variable flow-area valve, for regulating the flow of material 30 to boom pipe 24.

In the example embodiment, nozzle assemblies 22 include direct acting solenoid valve equipped nozzles and are spaced apart from each other along a length of boom pipe 24. Controller 60 (shown in FIG. 8) is coupled in communication with nozzle assemblies 22 to control operation of nozzle assemblies 22. In addition, in some embodiments, pump assembly 18 may include a pulse width modulation controlled pump 34 that is configured to provide a desired pressure of pressurized material 30 flowing through fluid dispersal system 10. In such embodiments, pump assembly 18 may be coupled in communication with controller 60. Controller 60 may be configured to vary operating parameters of pump assembly 18, such as a pulse frequency and/or a duty cycle, to facilitate obtaining a desired pressure of material 30 in fluid dispersal system 10. In some embodiments, controller 60 may control the pitch of fan 36 of pump assembly 18 to achieve variable system pressures of material 30. In the example embodiment, material 30 flows through nozzle assemblies 22 and may be dispensed onto the crop and/or the ground in different ways. For example, and without limitation, material 30 may be emitted from nozzle assemblies 22 in a pulsed pattern.

In other embodiments, fluid dispersal system 10 may have other configurations without departing from some aspects of the invention. For example, in some embodiments, fluid dispersal system 10 may include a fan apparatus to distribute the fluid. For example, the fluid dispersal system 10 may be an air blast sprayer. Accordingly, fluid dispersal system 10 may be used as an agricultural sprayer, e.g., an orchard sprayer, for spraying crops. Such crops may define a canopy at a distance above the ground. As described herein, fluid dispersal system 10 may facilitate control of characteristics of the fluid, e.g., pressure, flow rate, and droplet size, based on inputs such as a difference in velocity between an air speed of the airflow at the nozzle assembly 22 and a fluid exit velocity of the fluid emitted from the respective nozzle assembly 22. As a result, fluid dispersal system 10 may facilitate providing a desired droplet size and desired application rates to the crops adjacent the ground and in the canopy.

Figure 4:
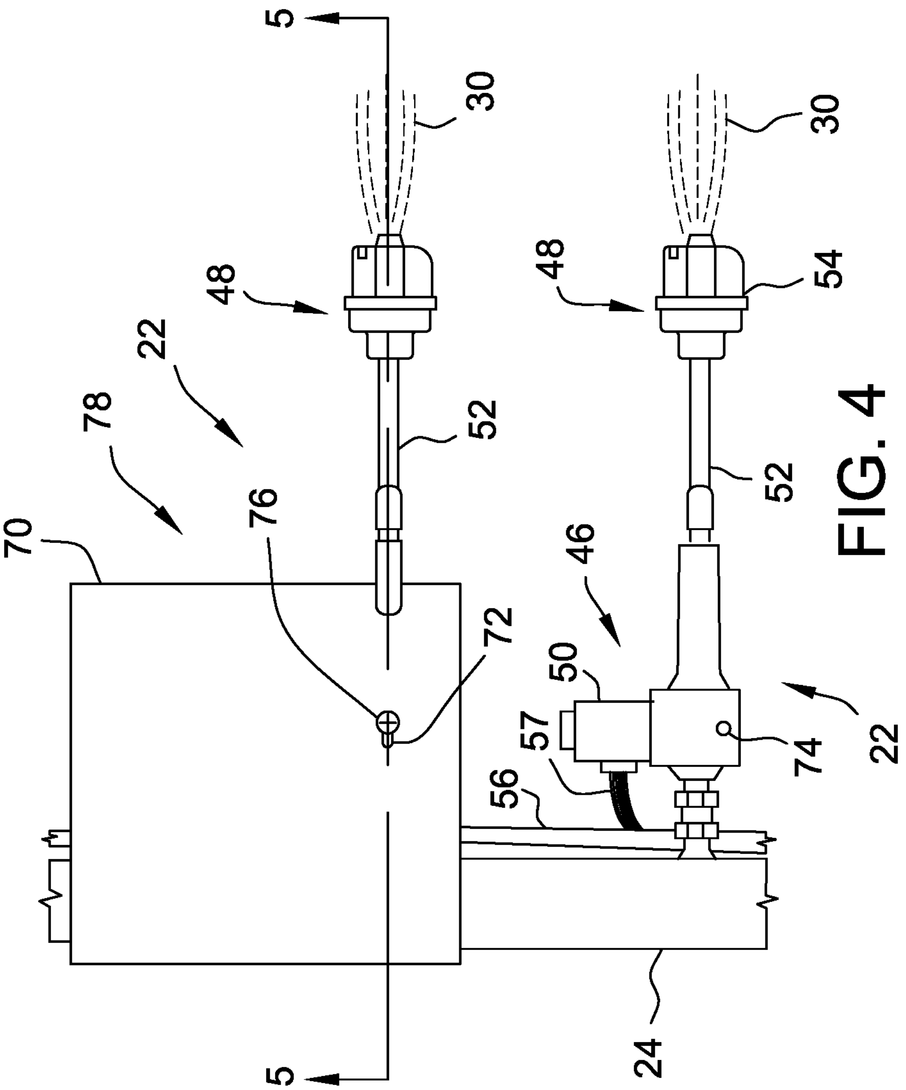
FIG. 4 is a schematic top view of an example nozzle assembly suitable for use with the fluid dispersal system shown in FIG. 1.
Figure 5:
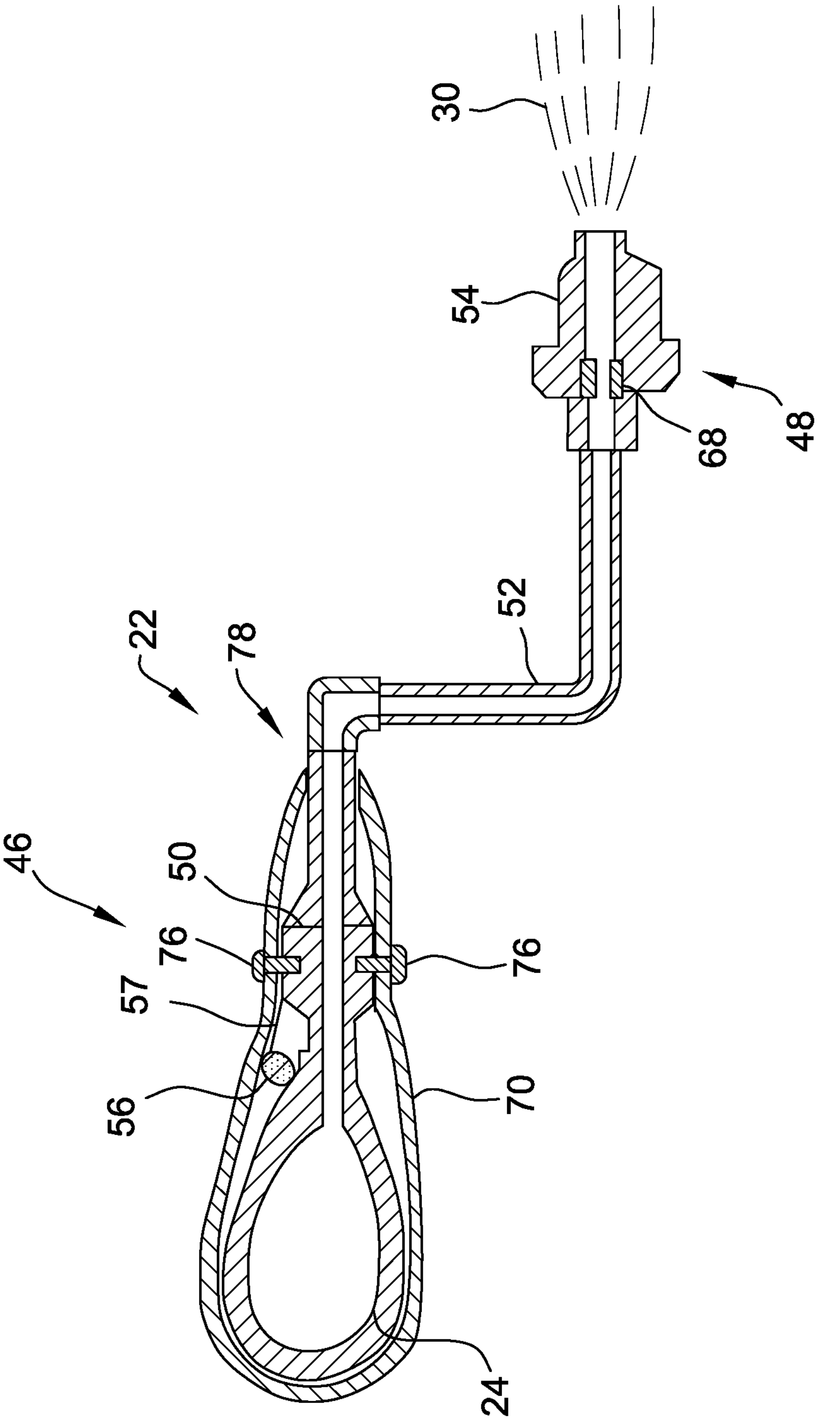
FIG. 5 is a sectional view of the nozzle assembly shown in FIG. 4, taken along line 5-5.

FIG. 4 is a schematic top view of nozzle assembly 22 suitable for use with fluid dispersal system 10 (shown in FIG. 1). FIG. 5 is a sectional view of nozzle assembly 22 taken along line 5-5. It should be appreciated that for aerial dispersal of material 30, nozzle assembly 22 may have an increased volume output as compared with nozzle assemblies used in ground-based fluid dispersal systems due to the increased operating speeds of aircraft, for example, aerial vehicle 12 (shown in FIG. 1).

In the example embodiment, nozzle assembly 22 is subject to and affected by air shear caused, in part, by the high-speed slipstream generated by aerial vehicle 12. Among other things, the angle at which material 30 is discharged from nozzle assembly 22 relative to the slipstream has a direct effect on the droplet spectra of material 30. For example, and without limitation, nozzle assemblies angled forward and downward into the slipstream generally produce smaller droplets and a wider range of droplet spectra than nozzles directed backward and parallel to the slipstream, as shown in FIGS. 4 and 5.

In the example embodiment, nozzle assembly 22 is coupled to boom pipe 24 for receiving material 30 therethrough. Nozzle assembly 22 includes a valve assembly 46 and a spray nozzle 48. Spray nozzle 48 may have any suitable nozzle configuration known in the art, for example, and without limitation, spray nozzle 48 may include a spray tip (not shown), such as a flat fan tip, cone tip, straight stream tip and/or any other suitable spray tip that enables nozzle assembly 22 to function as described herein. Similarly, valve assembly 46 may generally have any suitable valve configuration known in the art, for example, and without limitation, a latching solenoid valve, 2WNC solenoid valve, pilot actuated solenoid valve, flipper solenoid valve, and/or the like.

Figure 8:
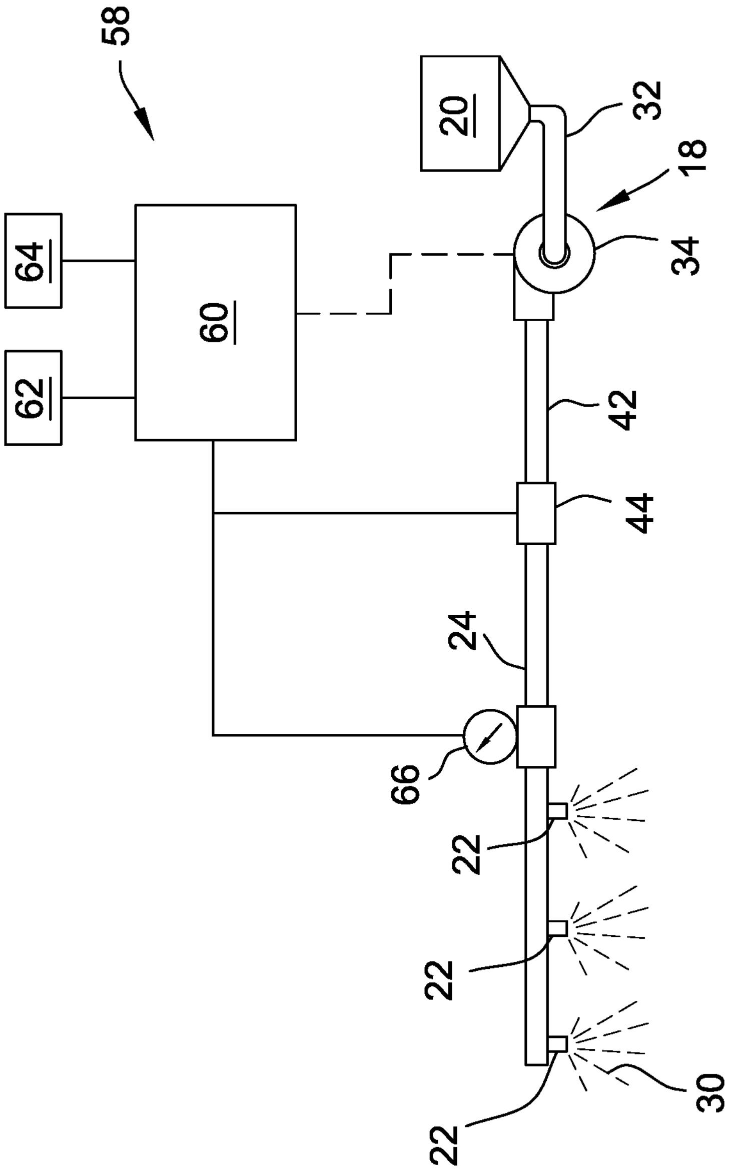
FIG. 8 is a schematic view of the fluid dispersal system shown in FIG. 1, and including a control system.

In the example embodiment, valve assembly 46 is a direct acting solenoid valve that includes an actuator 50 configured to pulse with a timing, duration, frequency, and duty cycle determined by controller 60 (shown in FIG. 8). In some embodiments, the pulse timing, duration, and/or frequency are suitable to reduce dynamic effects of pulsing on the upstream system pressure and flow, therefore creating a controlled variable resistance to flow. In alternative embodiments, valve assembly 46 may be pneumatically or hydraulically actuated. The term "duty cycle," as used herein, refers to the cycle of operation of the valve assembly operating intermittently rather than continuously and includes the percentage of time the valve assembly is open divided by the total operation time. The duty cycle controls the flow rate or emission rate of material 30 through nozzle assembly 22 in a rapid on/off manner. In some embodiments, spray nozzle 48 is configured to be mounted to and/or integrated within a portion of valve assembly 46.

In one embodiment, controller 60 is configured to regulate the timing and duration of valve assembly 46, and in particular, actuator 50, to control the phasing between nozzles assemblies 22 to facilitate reducing harmonics and/or vibrations of boom assembly 14. For example, the phasing and or timing of nozzle assemblies 22 can be regulated to facilitate reducing and/or eliminating water hammering in boom pipe 24. The phrase "water hammering" as used herein includes a sudden change in flow of material 30, which can result in shock waves propagating through fluid dispersal system 10. Flow changes can occur due to operation of nozzles assemblies 22, starting and stopping of pump assembly 18, and/or directional changes caused by fittings between nozzles assemblies 22 and boom pipe 24, for example.

In one particular embodiment, valve assembly 46 may be configured the same as or similar to the valves disclosed in U.S. Pat. No. 9,435,458 (the '458 patent), filed on Mar. 2, 2012, and entitled "Electrically Actuated Valve for Control of Instantaneous Pressure Drop and Cyclic Durations of Flow," which is incorporated by reference herein in its entirety for all purposes. Specifically, the '458 patent discloses a solenoid valve in which the valve poppet is configured to be pulsed such that the cyclic durations of the poppet control the average flow rate through the valve. For example, the valve may be operated with a pulse-width modulation, in which the poppet moves from a sealed position to an open position relative to the valve inlet and/or valve outlet and the duty cycle of the pulse controls the average flow rate. Additionally, the pressure drop across the valve may be controlled during each pulse of the poppet by regulating the position to which the poppet is moved relative to the valve inlet and/or the valve outlet. For instance, the displacement of the poppet may be regulated such that the valve is partially opened during each pulse.

In the example embodiment, spray nozzle 48 includes a nozzle body portion 52, which receives material 30 flowing through boom pipe 24, and a nozzle head 54 attached to and/or formed integrally with nozzle body portion 52. Nozzle head 54 is configured for emitting material 30 from spray nozzle 48 onto the crop and/or the ground.

In the example embodiment, an electrical cable assembly 56 extends along boom pipe 24 and includes a plurality of connectors 57. Each actuator 50 is connected to cable assembly 56 by a respective connector 57. Cable assembly 56 is also coupled to controller 60 and facilitates transmitting power and control signals from controller 60 to each actuator 50.

To facilitate protecting each cable assembly 56 and each actuator 50 from the high-speed slipstream generated by aerial vehicle 12, one or more airfoil-shaped shells 70 are coupled to valve assemblies 46. In particular, in the example embodiment, a single shell 70 is coupled to each discrete valve assembly 46. As best shown in FIG. 5, shell 70 is formed from a sheet material and is shaped to enclose and generally conform to boom pipe 24 and valve assembly 46. For clarity, only one shell 70 is shown in FIG. 4. Shell 70 is configured to enclose a single valve assembly 46. As such, a plurality of shells 70 are coupled to the valve assemblies 46 and extend along boom pipe 24 to create a protective assembly extending along the length of boom pipe 24 and protecting each valve assembly 46. The individual shells 70 enable a single shell 70 to be removed from boom pipe 24 and a respective valve assembly 46 to facilitate maintenance and/or replacement of a single valve assembly 46 without removing the entire protective shell from boom pipe 24.

Shells 70 include a slot 72 formed through the top and bottom walls of shell 70. Each slot 72 is configured to generally align with a respective connection point 74 of valve assembly 46. In the example embodiment, connection point 74 includes a female threaded portion defined in valve assembly 46 for receiving, for example, a threaded fastener 76 therethrough.

Shell 70 may be formed from a single piece of sheet material and shaped to closely conform to boom pipe 24 and valve assembly 46, as described above. In particular, shell 70 has a general airfoil shape that has a trailing edge portion 78 defined by two edges of the sheet material. Shell 70 may be coupled to boom pipe 24 and valve assembly 46 by displacing the sheet material edges defining trailing edge portion 78 apart and sliding shell 70 over boom pipe 24 and valve assembly 46. A fastener 76 is coupled to each connection point 74 of valve assembly 46 to facilitate retaining shell 70 in place.

Figure 6:
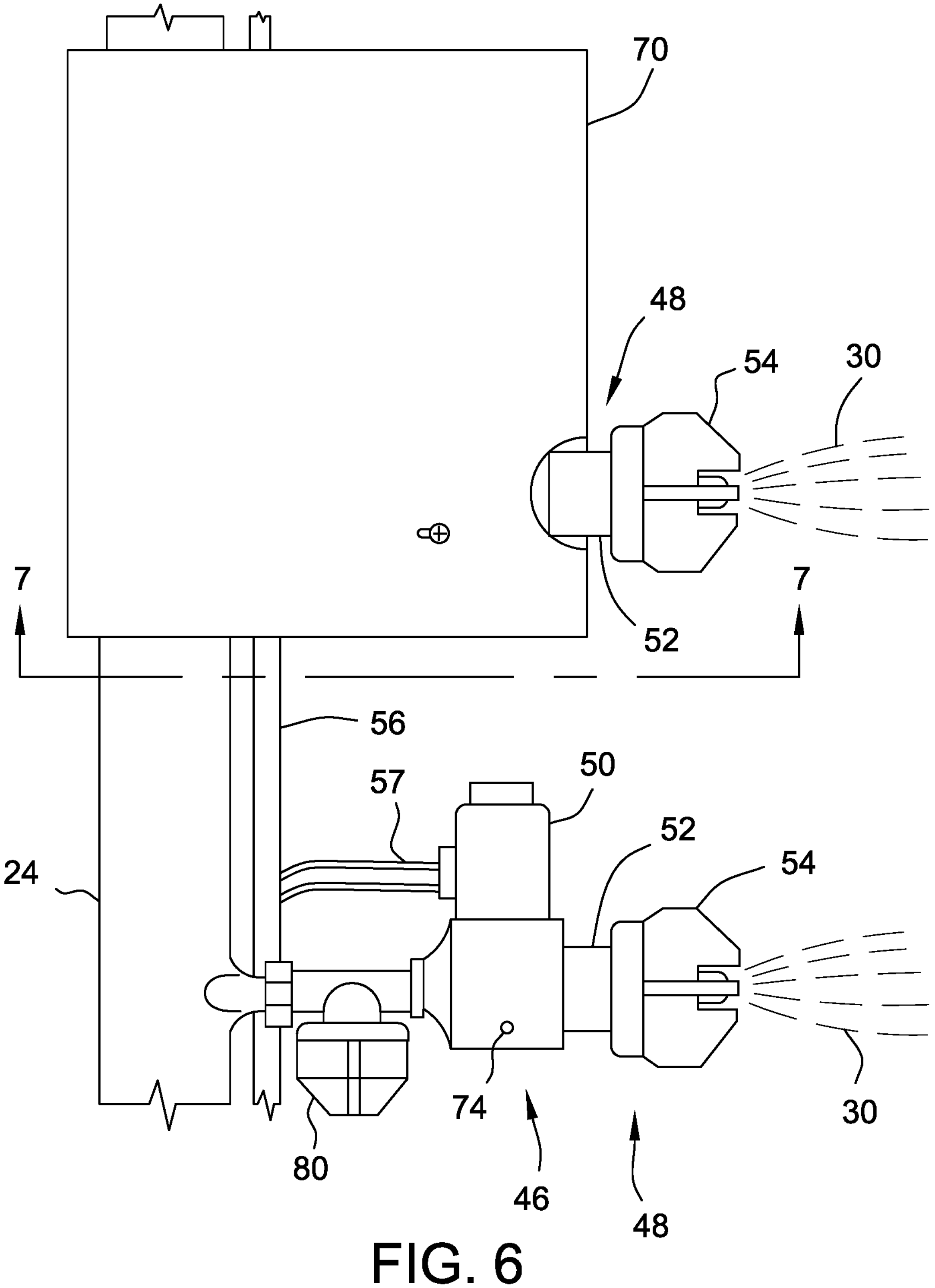
FIG. 6 is a schematic top view of an alternative nozzle assembly including a drip check valve.
Figure 7:
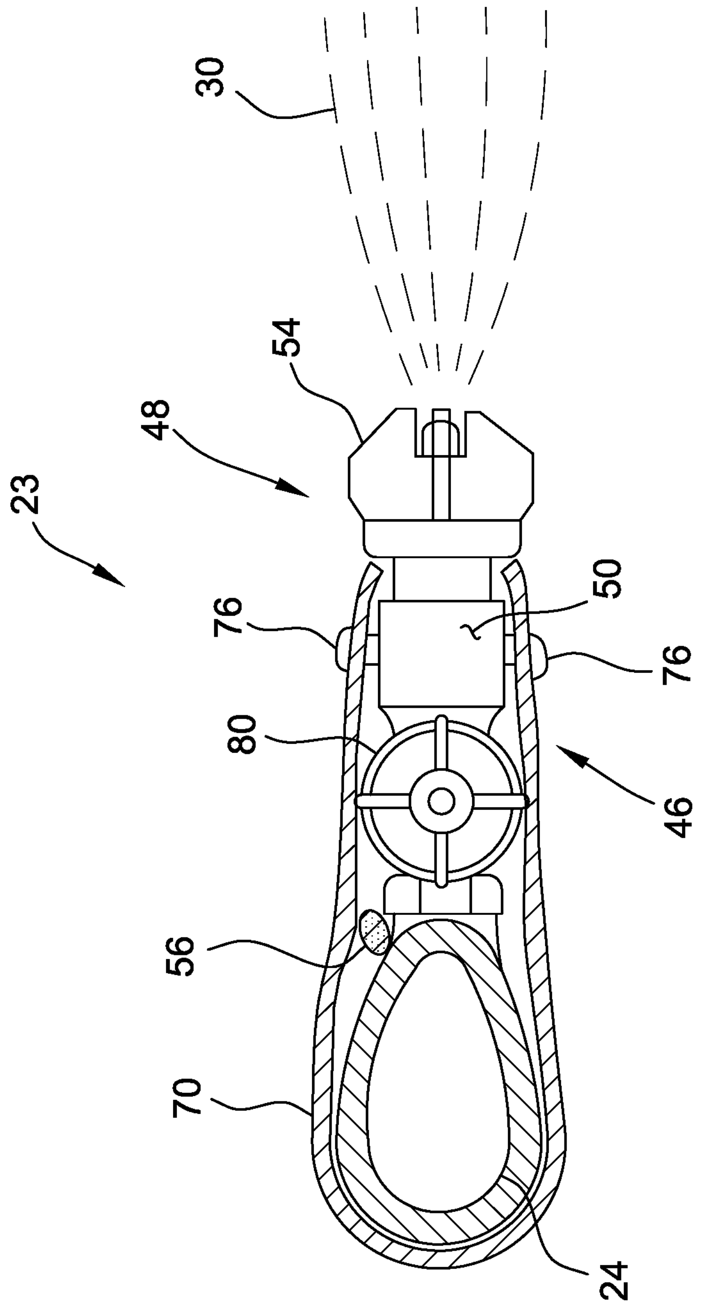
FIG. 7 is a sectional view of the alternative nozzle assembly shown in FIG. 6, taken along line 7-7.

FIG. 6 is an alternative nozzle assembly 23 including a drip check valve 80 attached between nozzle assembly 23 and boom pipe 24. FIG. 7 is a sectional view of nozzle assembly 23 taken along line 7-7. In the example embodiment, nozzle assembly 23 is similar to nozzle assembly 22, but includes a drip check valve 80 that facilitates drip-free shut-off of nozzle assembly 23. In addition, nozzle assembly 23 is illustrated with a spray nozzle 48 extending straight out of a valve assembly 46.

FIG. 8 is a schematic view of fluid dispersal system 10 including a control system 58. Control system 58 generally includes controller 60, metering device 44, a position device 62, and at least one atmospheric data device 64. In some embodiments, fluid dispersal system 10 may also include one or more pressure regulators 66. In the example embodiment, control system 58 may be used with or incorporate one or more aspects of the equipment, such as aerial vehicle 12 and/or fluid dispersal system 10, described above with reference to FIGS. 1-5. In addition, in some embodiments, control system 58 may include a respective atmospheric data device 64 corresponding to a position of each respective nozzle assembly 22 and/or set of nozzle assemblies.

In operation, material 30 flows from fluid reservoir 20 to centrifugal pump 34 through inlet conduit 32. Material 30 is pressurized by centrifugal pump 34 and channeled to metering device 44 through outlet conduit 42. Material 30 then flows through metering device 44 and, in some embodiments, pressure regulator 66, to boom pipe 24. Material 30 then flows to nozzle assemblies 22 where it is dispensed onto the crop and/or the ground.

In the illustrated embodiment, nozzle assemblies 22 are coupled in communication with control system 58. In particular, each actuator 50 of each valve assembly 46 is coupled in communication with controller 60. Controller 60 controls one or more operating parameters of each valve assembly 46, for example, and without limitation, a timing, a duration, a duty cycle percentage, and/or a pulse frequency of the valve assembly. In one embodiment, valve assembly 46 has an operational frequency in the range of between and including about 0 Hertz (Hz) and about 15 Hz, and can have a duty cycle in the range between and including 0% to 100%.

In one particular embodiment, controller 60 may be configured the same as or similar to the controller disclosed in U.S. Pat. No. 8,191,795 (the '795 patent), filed on Jul. 31, 2009, and entitled "Method and System to Control Nozzles While Controlling Overall System Flow and Pressure," which is incorporated by reference herein in its entirety for all purposes. Specifically, the '795 patent discloses using a "flow factor" for individually scaling fluid flow from each valve assembly 46. For example, the controller is configured to control the rate at which the liquid agricultural product is emitted from each valve based upon the calculated flow factor for each valve.

In the example embodiment, metering device 44 is used to monitor and/or regulate an amount of material 30 that is channeled to boom pipe 24 by pump assembly 18. In one embodiment, metering device 44 sends flow rate information to controller 60 for use in determining duty cycle percentages for each of nozzle assemblies 22 based on, in part, a ground speed, a vehicle air speed at which fluid dispersal system 10 is being moved across a surface, such as a field containing the crop, and/or a fluid exit velocity at one or more of spray nozzles 48. As used herein, the term "ground speed" refers to the actual speed of aerial vehicle 12 over the surface of the ground. The term "vehicle air speed" refers to the sum of the ground speed of, for example, aerial vehicles 12 and 13, and a velocity of the prevailing wind. The term "fluid exit velocity" refers to the speed of fluid when the fluid is discharged from an outlet.

Optionally, or in addition, in one embodiment, control system 58 includes one or more pressure regulators 66, which include, for example, and without limitation, a throttle valve that can be used for regulating the pressure of the liquid agricultural product within fluid dispersal system 10. As described herein, the use of localized boom pressure and/or regulated pressure drop across nozzle valve assemblies 46 facilitate maintaining pressure and establishing and/or controlling a droplet size and/or emission rate of material 30. In one embodiment, the droplet size of material 30 may result from a particular nozzle assembly 22, the localized air velocity, and fluid exit velocity of material 30 emitted from nozzle assembly 22. The droplet size of material 30 may be controlled to facilitate reducing an amount of off target drift or to facilitate enhancing the spray coverage in a specific area. For example, the droplet size of material 30 can be regulated to be larger and/or smaller for each individual nozzle assembly during use of fluid dispersal system 10.

As described above, in the example embodiment, controller 60 is configured to regulate the overall application rate of material 30 by fluid dispersal system 10 to achieve predetermined flow and pressure objectives while regulating or controlling the individual flow of each individual nozzle assembly 22 to achieve a specific distribution of material 30 across boom pipe 24. More particularly, controller 60 is configured to receive various input data, including, for example, and without limitation, flow rate data, a target application rate for material 30, nozzle droplet spectra data, a ground speed and/or a vehicle air speed at which fluid dispersal system 10 is being moved across a surface, wind speed, wind direction, release height of material 30, a position of fluid dispersal system 10, characteristics of the vehicle such as weight and length, characteristics of a surface below the vehicle, and air temperature. Controller 60 may be configured to receive the target application or flow rate information based on, e.g., a user input target application rate input at a user input device (not shown).

Metering device 44 measures a flow rate of material 30 and transmits a flow rate signal to controller 60. As used herein, the term “flow rate” includes the volume of material 30 per unit time flowing through boom pipe 24 and nozzle assemblies 22. In some embodiments, controller 60 is coupled in communication with the pump assembly 18 and is configured to adjust and/or control the pressure and/or the flow rate of material 30 through fluid dispersal system 10 by adjusting the operation of pump assembly 18. For example, and without limitation, controller 60 may adjust the pitch of fan 36 to increase or decrease the pressure and/or the flow rate of material 30 through fluid dispersal system 10, or increase or decrease the controlling pulse frequency and/or duty cycle of centrifugal pump 34.

Moreover, controller 60 additionally receives the target application rate from a user, and a ground speed from position device 62. Position device 62 may be any device capable of measuring a ground speed of fluid dispersal system 10, such as, for example, a ground speed of aerial vehicle 12 (shown in FIG. 1). Alternatively, position device 62 may be configured to measure a relative speed, such as ground speed, between the application target and one or more of nozzle assemblies 22. In some embodiments, position device 62 includes, for example and without limitation, a GPS receiver. In one example embodiment, position device 62 includes a dual GPS processor subsystem that includes two wing-tip mounted antennas to determine aerial vehicle 12 attitude, and more specifically the aerial vehicle 12 heading. In another embodiment, position device 62 includes a GPS processor subsystem in combination with an inertial measurement unit.

In the example embodiment, controller 60 is configured to adjust the flow rate of material 30 through fluid dispersal system 10 based at least in part on the information received from position device 62 and the target application rate. To adjust the flow rate, controller 60 is configured to control and/or adjust one or more operating parameters of valve assemblies 46 of the nozzle assemblies 22. For example, in some embodiments, controller 60 is configured to control one or more operating parameters of valve assemblies 46 of the nozzle assemblies 22, including, for example, timing, duration, duty cycle percentage, coil current, pilot pressure, and/or pulse frequency of the nozzle assembly. As described above, controller 60 receives a target application rate from a user, which includes, for example, an amount of material 30 coverage per unit of area (e.g., gallons per acre). Accordingly, controller 60 adjusts the flow rate of material 30 to achieve the target application rate, taking into account, for example, the ground speed of aerial vehicle 12, and thus fluid dispersal system 10, received from position device 62.

In some embodiments, for example, as the ground speed of aerial vehicle 12 increases, controller 60 increases a flow rate of material 30 through fluid dispersal system 10 to maintain the target application rate. Similarly, as the ground speed of aerial vehicle 12 decreases, controller 60 decreases a flow rate of material 30 through fluid dispersal system 10 to maintain the target application rate.

Furthermore, in one embodiment, position device 62 may provide attitude information of aerial vehicle 12 to controller 60, such as, pitch and/or angle of attack. In addition, controller 60 may monitor a volume of material 30 in fluid reservoir 20, for example by directly monitoring volume using one or more sensors (not shown) or estimating a remaining volume based on the operating parameters of valve assemblies 46 (e.g., calculating the dispersed volume of material 30). Controller 60 is configured to adjust the operating parameters of valve assemblies 46 to adjust for such attitude changes and/or fluid volume changes to facilitate maintaining and/or increasing the uniformity of the distribution pattern or profile of material 30. It should be appreciated that as material 30 is dispersed from aerial vehicle 12, the volume of material 30 in fluid reservoir 20 decreases, and the load and, therefore, the vehicle becomes lighter. As aerial vehicle 12 becomes lighter, the attitude of the vehicle may change, resulting in airflow changes across the vehicle, such as the wings. In addition, as the weight of aerial vehicle 12 changes, the size and magnitude of wing tip vortices changes, which may affect the uniformity of the distribution pattern or profile of material 30.

In addition, independently and selectively controlling the dispersal of material 30 through each nozzle assembly 22 with respect to a position of aerial vehicle 12 facilitates controlling dispersal rates to different zones of the crop and/or the surface of the ground. For example, designated zones in and around a field to be sprayed may require different treatment amounts by fluid dispersal system 10, ranging from little or no application of material 30 (e.g., outside the boundary of a given field) to a maximum application rate in heavily infested areas or regions of poor fertility. The boundaries for such differential application rate spray zones can be irregular, with such irregularities increasing the difficulty of manually altering spray system operating conditions by an on-board user. In addition, the boundaries may not intersect at perpendicular angles with the crop rows. The independent and selective control of each nozzle assembly 22 facilitates point row and/or edge of field control of the dispersal of material 30. Moreover, problems can arise due to operator reaction times when changed field conditions call for adjustments to the spray conditions. For example, if a user is alerted that he or she has crossed a field boundary or property line and initiates a procedure for altering spray application, many known spray control systems have an inherent delay, resulting in overspray.

In the example embodiment, controller 60 is configured to control certain operating parameters of valve assemblies 46 in order to control an emission rate of nozzles assemblies 22. As used herein, the phrase “emission rate” includes the time-averaged volume of material 30 that passes through a nozzle assembly 22 per unit time, for example, and without limitation, cubic meters per second and gallons per minute. The emission rate may be affected by, for example, various properties of material 30, such as, and without limitation, surface tension, density, viscosity, and the like. In addition, in order to control an emission rate of nozzles assemblies 22, controller 60 may automatically change the operating parameters of the valve assemblies 46 of the nozzle assemblies when a user of aerial vehicle 12 changes the operating conditions of fluid dispersal system 10, such as, and without limitation, a pressure of material 30, the overall application rate, the ground speed of aerial vehicle 12, and the like. For the illustrated embodiment, the operating parameters controlled by controller 60 may include timing, duration, pulse frequency and/or duty cycle of valve assemblies 46, and an extent to which valve assemblies 46 are opened. By varying the timing, duration, duty cycle and/or pulse frequency of valve assemblies 46, and, in some embodiments, the extent to which valve assemblies 46 are opened, controller 60 regulates the emission rate of material 30 through the nozzle assemblies 22.

Furthermore, controller 60 is also configured to receive atmospheric data from atmospheric data device 64. The atmospheric data includes, for example, and without limitation, wind speed, wind direction, air pressure, relative humidity, and ambient air temperature. Controller 60 is configured to determine air speed of fluid dispersal system 10 based on information received from atmospheric data device 64 and/or position device 62. Accordingly, in some embodiments, controller 60 is configured to adjust the flow rate of material 30 through fluid dispersal system 10 and/or the operating parameters of valve assemblies 46 based at least in part on the information received from atmospheric data device 64, position device 62, and the target application rate.

For example, in one embodiment, controller 60 adjusts the flow rate of material 30 to achieve the target application rate, taking into account, for example, the ground speed of aerial vehicle 12, and thus fluid dispersal system 10, received from position device 62 and the atmospheric data received from atmospheric data device 64. Controller 60 may determine a relative speed difference between the fluid exit velocity of material discharged from each nozzle assembly 22 and the air speed of vehicle 12 and adjust the flow rate of material 30 based on the relative speed difference. In addition, in some embodiments, controller 60 may adjust one or more operating parameters of each nozzle assembly 22, for example and without limitation, timing, duration, duty cycle percentage, and/or pulse frequency of the valve assembly, based on the atmospheric data, for example, to account for drift of material 30 and/or the deposition variability of material 30 based on evaporation of droplets as they fall onto the crop and/or the surface of the ground. Moreover, controller 60 may adjust one or more operating parameters of each nozzle assembly 22, including shutting off one or more nozzle assemblies 22 nearest the most turbulent areas along boom pipe 24, for example, and without limitation, those nozzle assemblies 22 nearest the air rotating from propeller 38 (i.e., prop wash) and the air being forced outward from beneath the wing tips (i.e., wing tip vortices). In some embodiments, controller 60 may vary the fluid exit velocity of the stream of material 30 emitted by each nozzle assembly 22 to maintain a desired droplet size of material 30 as the localized air speed varies due to the prop wash. In addition, the pulse frequency of each nozzle assembly 22 may be adjusted to be synchronous with rotation of propeller 38. As a result, the material 30 may be distributed with increased uniformity across the distribution profile.

Control system 58 is described by way of example only. In other embodiments, control system 58 may have any other suitable configuration that enables the system to function as described herein. For example, in some embodiments, controller 60 may be a portion of a larger system controller, e.g., for aerial vehicle 12 (shown in FIG. 1). Additionally, position device 62 and atmospheric data device 64 may be a single system, such as, for example, a plurality of sensors combined into a wind measurement system, such as the Aircraft Integrated Meteorological Measurement System (AIMMS) built by Aventech Research Inc., Barrie, Ontario, Canada. In some embodiments, an altimeter, such as a laser altimeter, could be used to provide altitude measurements and/or surface topography information.

Controller 60 is not limited to use in aerial applications. For example, in some embodiments, fluid dispersal system 10 may include a fan configured to generate an airflow for distributing fluid emitted by nozzle assemblies 22, e.g., an air blast sprayer. In such embodiments, controller 60 may be configured to control the operating parameters of valve assemblies 46 and, thereby, control an emission rate of nozzles assemblies 22 based on characteristics of the airflow. For example, controller 60 may control valve assemblies 46 to obtain a desired pressure and/or droplet size of fluid emitted from the nozzle assemblies. Controller 60 may control valve assemblies 46 based on any operating parameters of fluid dispersal system 10 including, without limitation, a differential between the localized air speed of the airflow at the nozzle assembly 22 and the fluid exit velocity of material 30 discharged from the respective nozzle assembly 22.

In the example embodiment, fluid dispersal system 10 is not limited to any particular number or configuration of nozzle assemblies 22. In addition, as described above, in other embodiments, fluid dispersal system 10 may not include pressure regulators 66, or alternatively may include any other suitable means for measuring and/or regulating pressure in boom pipe 24. In still other embodiments, pump assembly 18, and in particular, centrifugal pump 34, may not be a pulse width modulation controlled pump, and the flow rate of material 30 through fluid dispersal system 10 may instead be regulated by a flow valve (not shown), controlled by controller 60 and/or a user of fluid dispersal system 10, and positioned downstream of centrifugal pump 34.

In the example embodiment, controller 60 generally includes any suitable computing device and/or other processing unit, including any suitable combination of computers, processing units, and/or the like that may be operated independently or in connection within one another. Thus, controller 60 includes one or more processor(s) and associated memory device(s) configured to perform a variety of computer-implemented functions including, but not limited to, the calculations disclosed herein. As used herein, the term "processor" refers not only to integrated circuits, but also refers to a microcontroller, a microcomputer, a programmable logic controller (PLC), an application specific integrated circuit, and other programmable circuits. Additionally, the memory device(s) of controller 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure and/or cause the associated controller to perform various functions including, but not limited to, controlling the duty cycle and/or pulse duration of valve assembly 46.

Figure 9:
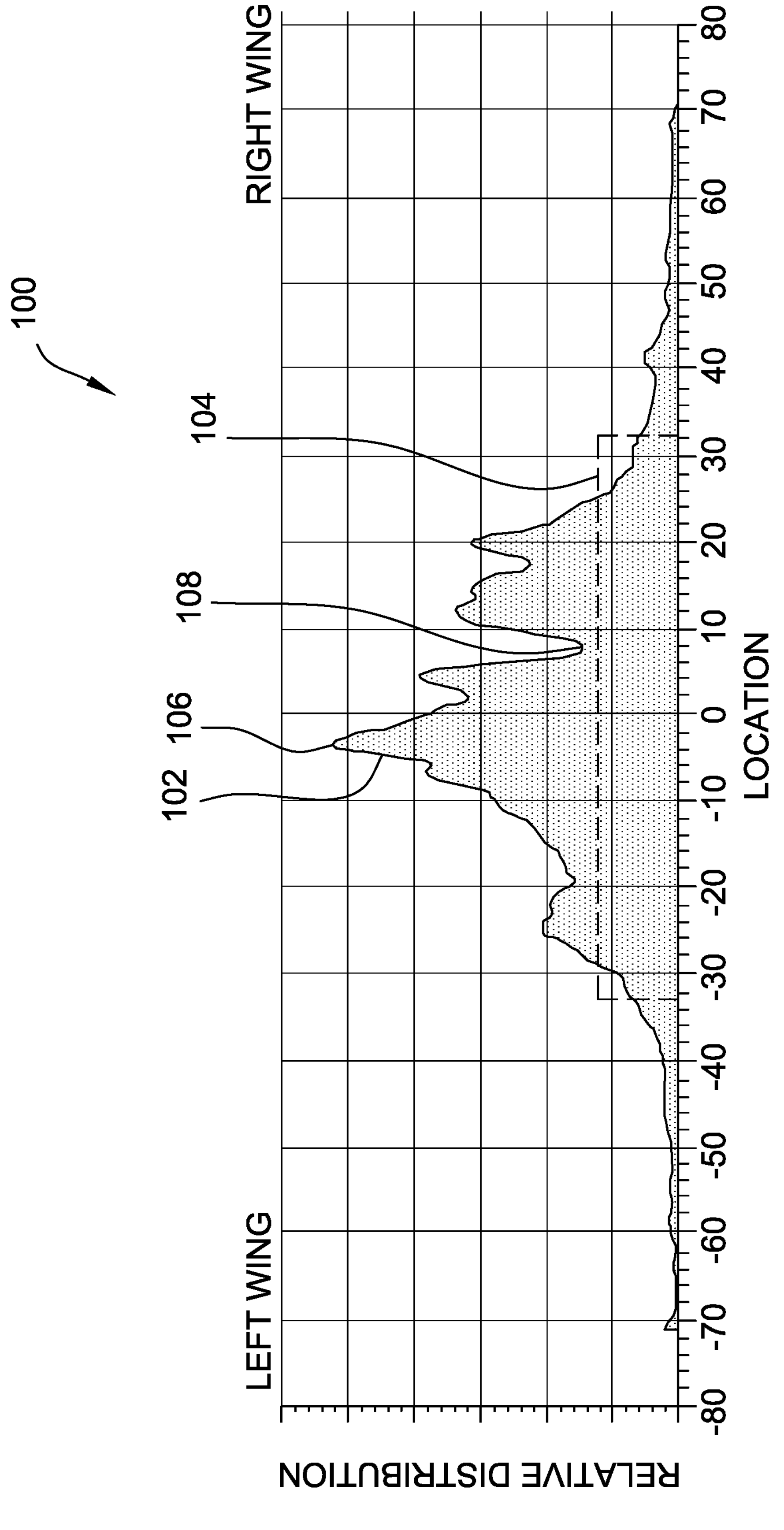
FIG. 9 is a graph of an example distribution profile of a fluid dispersed from the aerial vehicle shown in FIG. 1, using the control system shown in FIG. 8.

FIG. 9 is a graph 100 of an example aerial distribution profile 102 of a fluid, such as material 30, dispersed from aerial vehicle 12 (shown in FIG. 1) using control system 58 (shown in FIG. 8). In the example embodiment and with reference to FIGS. 1-8, aerial distribution profile 102 illustrates an aerial distribution pattern or profile of a fluid dispersed from fluid dispersal system 10 attached to, for example, aerial vehicle 12, and having a boom pipe 24 width of approximately 35 feet. In particular, aerial distribution profile 102 shows a relative distribution of fluid onto, for example, a field, based on a location relative to a centerline of aerial vehicle 12. For example, in FIG. 9, location "0" corresponds to the centerline of aerial vehicle 12, location "−70" corresponds to a location that is 70 units (e.g., 70 feet (ft.)) away from and to the left of the centerline of aerial vehicle 12, and location "70" corresponds to a location that is 70 units (e.g., 70 ft.) away from and to the right of the centerline of aerial vehicle 12. As illustrated by aerial distribution profile 102, the distribution of fluid varies considerably across the measured distribution width, i.e., the location axis. The distribution of the fluid is disrupted by turbulence due to the wake of aerial vehicle 12 in flight, such as air rotating from propeller 38 (i.e., prop wash) and by air being forced outward from beneath the wing tips (i.e., wing tip vortices). Small droplets of the fluid are carried further off target by this turbulence than larger droplets, as shown by the distribution width onto a field extending greater than 140 ft.

Prop wash turbulence, which is the result of the clockwise propeller air helix spiraling along the fuselage and along a bottom of the wings, carries droplets from nozzles to the right of the fuselage and deposits them on the target located beneath or to the left of the fuselage, as indicated by the portion of aerial distribution profile 102 between peak 106 and valley 108. The result of prop wash is a reduced amount of material 30 being applied to the crop and/or ground from approximately the center to approximately 8 feet right of the centerline of aerial vehicle 12. In addition, this results in an increased amount of material 30 being applied to the crop and/or ground from approximately the center to approximately 8 feet left of the centerline of aerial vehicle 12. As can be seen by aerial distribution profile 102, prop wash adds to the variance of the deposition of material 30.

It should be appreciated that aerial distribution profile 102 is different for each aerial vehicle, such as aerial vehicles 12 or 13. In particular, because no two aircraft are exactly alike, the boom assemblies, such as boom assembly 14, may be mounted differently, and each pilot may have has his own flying technique, every aerial vehicle and pilot combination produces its own unique distribution profile. Differences in booms and hanger styles, boom hanger position and angles, nozzle designs, and nozzle angles are a few of the items that may affect the uniformity of the distribution pattern or profile of material 30.

To determine the initial distribution profile 102 of the fluid dispersed by aerial vehicle 12, in one embodiment, a pattern test using, for example, a string kit may be used. For example, a string is suspended 12 to 24 inches above the crop and/or ground surface and is oriented substantially perpendicular to the wind direction. Aerial vehicle 12 passes over the string having a flight path centerline perpendicular to the string, and disperses a water/dye mixture into the air. The water/dye mixture then falls onto the string. The string is then wound up and packaged for deposition analysis. Each string may be individually evaluated and related to individual passes of aerial vehicle 12 to allow the analysis to relate to a specific air characteristic on the pass. In other embodiments, an average may be then taken from two or more repetitions of the pattern test. The deposition analysis provides, for example, aerial distribution profile 102 depicting the relative deposition of the water/dye mixture across the string. In addition, the analysis provides an effective swath width of fluid dispersal system 10 based on a calculated coefficient of variation (CV) of aerial distribution profile 102. In the example embodiment, dashed line 104 represents a determined effective swath width of fluid dispersal system 10, which is a swath width of about 65 ft. corresponding to a CV of about 40%.

In another embodiment, a pattern test using, for example, a droplet or spot card kit may be used. For example and without limitation, a plurality of spot cards or water sensitive papers are laid out along the ground surface in a line that is oriented substantially perpendicular to the wind direction. The spot cards may be spaced between about 3 to 5 feet apart. Aerial vehicle 12 passes over the line of spot cards having a flight path centerline perpendicular to the line, and disperses a water/dye mixture into the air. The water/dye mixture then falls onto the spot cards. The entire set of spot cards are then visually analyzed by scanning them for uniformity.

In some embodiments, the aerial distribution profile 102 may be an optimized or desired aerial distribution profile that is used to determine a characteristic such as an emission rate of fluid from one or more of the valve assemblies 46. In other words, the characteristic such as the emission rate may be determined based on a desired aerial distribution profile in a "backwards" or "iterative" modeling process. As a result, the aerial distribution profile 102 may be adjusted in real-time and the fluid dispersal system 10 allows for simpler adjustments of the aerial distribution profile 102. In addition, the fluid dispersal system 10 facilitates reducing the coefficient of variation (CV) of aerial distribution profile 102.

In one embodiment, the determination of distribution profile 102 is based on a predictive computer model. The predictive computer model can be included in controller 60 or can be part of an offsite computing device (not shown). Models for predicting dispersion and deposition of aerially released materials have been in development for more than 35 years in joint projects with the U.S.D.A. Forest Service, in cooperation with the U.S. Army. Computerized codes which are currently available include AGDISP (Agricultural DISPersal) (Bilanin et al., 1989) and FSCBG (Forest Service Cramer-Barry-Graham) (Teske et al., 1992b). Such computerized predictive models are useful tools to facilitate predicting dispersion patterns of various liquids under a variety of conditions. Variables such as the properties of nozzle assemblies 22 (e.g. type of nozzle, nozzle tip, spray cone, fan angle), atmospheric conditions (wind, air pressure, humidity, temperature, etc.), aerial vehicle 12 speed/direction, terrain (hills and angle), spray pressure, fluid flow rate and other conditions are used to feed into the predictive models lookup table and geometric calculations (e.g. height of spray boom or height of the nozzles, length of the boom, dip angle of the boom) to facilitate determining an aerial distribution profile (e.g., an amount and distribution the fluid, e.g. material 30, on the crop and/or surface of the ground).

In the example embodiment, the coefficient of variation (CV) of aerial distribution profile 102 is determined across effective swath width 104. As used herein, CV refers to a measure of dispersion that describes the amount of variability of aerial distribution profile 102 relative to the average deposition rate of the fluid across effective swath width 104. In some applications, effective swath width 104 of aerial distribution systems is determined based on a maximum or acceptable CV value, such as, for example, and without limitation, 15%. In such applications, effective swath width 104 is determined based on a maximum width of aerial distribution profile 102 that does not exceed the acceptable CV value. Accordingly, in such applications, decreasing the CV value for a given aerial distribution profile may facilitate increasing the effective swath width of aerial distribution systems.

To provide the determined emission rate, the controller 60 may control or adjust one or more operating parameters of each valve assembly 46, for example, and without limitation, timing, duration, duty cycle percentage, pulse frequency of the valve assembly, and/or an extent to which the valve assembly is opened. For example, referring to FIG. 9, controller 60 may be programmed to increase a duty cycle percentage and/or a pulse frequency of valve assemblies 46 positioned near the right side of aerial vehicle 12 to facilitate increasing an emission rate of the nozzle assemblies corresponding to valley 108 of aerial distribution profile 102. Alternatively, or in addition, controller 60 may be programmed to decrease a duty cycle percentage and/or a pulse frequency of valve assemblies 46 positioned near the left side of aerial vehicle 12 to facilitate decreasing the emission rate of the nozzle assemblies corresponding to peak 106 of aerial distribution profile 102.

Accordingly, by adjusting the one or more operating parameters of each valve assembly 46 to control their respective emission rates, controller 60 facilitates regulating and/or increasing the uniformity of aerial distribution profile 102, thereby generating an aerial distribution profile. Regulating and/or increasing the uniformity of the aerial distribution profile 102 using controller 60 facilitates controlling and/or reducing the CV of the aerial distribution profile. An advantage of reducing the CV of the compensated aerial distribution profile is enabling an increase in effective swath width 104.

In addition, in another embodiment, controller 60 may be programmed to turn off and/or on any number of nozzle assemblies 22 while maintaining an increase in the uniformity of aerial distribution profile 102. For example, and without limitation, along an edge of the field or proximate other boundaries within the field, controller 60 may turn on or off one or more of the nozzles assemblies 22 to adjust the effective swath width of material 30 while maintaining uniformity of dispersal. Furthermore, controller 60 may be used to pre-determine a dispersal route of material 30. For example, a map of the field may be input into controller 60, and the controller may determine an efficient route that may use even swath widths for the entirety of the field, where the swaths are narrower than the effective swath width 104, described above. Such swath planning may facilitate more efficient and even distribution of material 30 onto the field and/or ground surface, for example, by maintaining a substantially similar distribution profile of material 30 for each pass. As described above, controller 60 is configured to maintain the overall application rate of material 30 by fluid dispersal system 10 to achieve predetermined flow and pressure objectives while adjusting the effective swath width.

Moreover, in another embodiment, a physical position (i.e. a position along boom pipe 24 and/or an angle relative to boom pipe 24) of each nozzle assembly 22 may be altered to facilitate increasing the uniformity of aerial distribution profile 102. Moreover, the overall number of nozzle assemblies 22 may be increased and/or decreased. By adjusting the physical position and/or number of nozzle assemblies 22, and adjusting the one or more operating parameters of each nozzle assembly 22 to control their respective emission rates, controller 60 may further increase the uniformity of aerial distribution profile 102 to generate the compensated aerial distribution profile.

Figure 10:
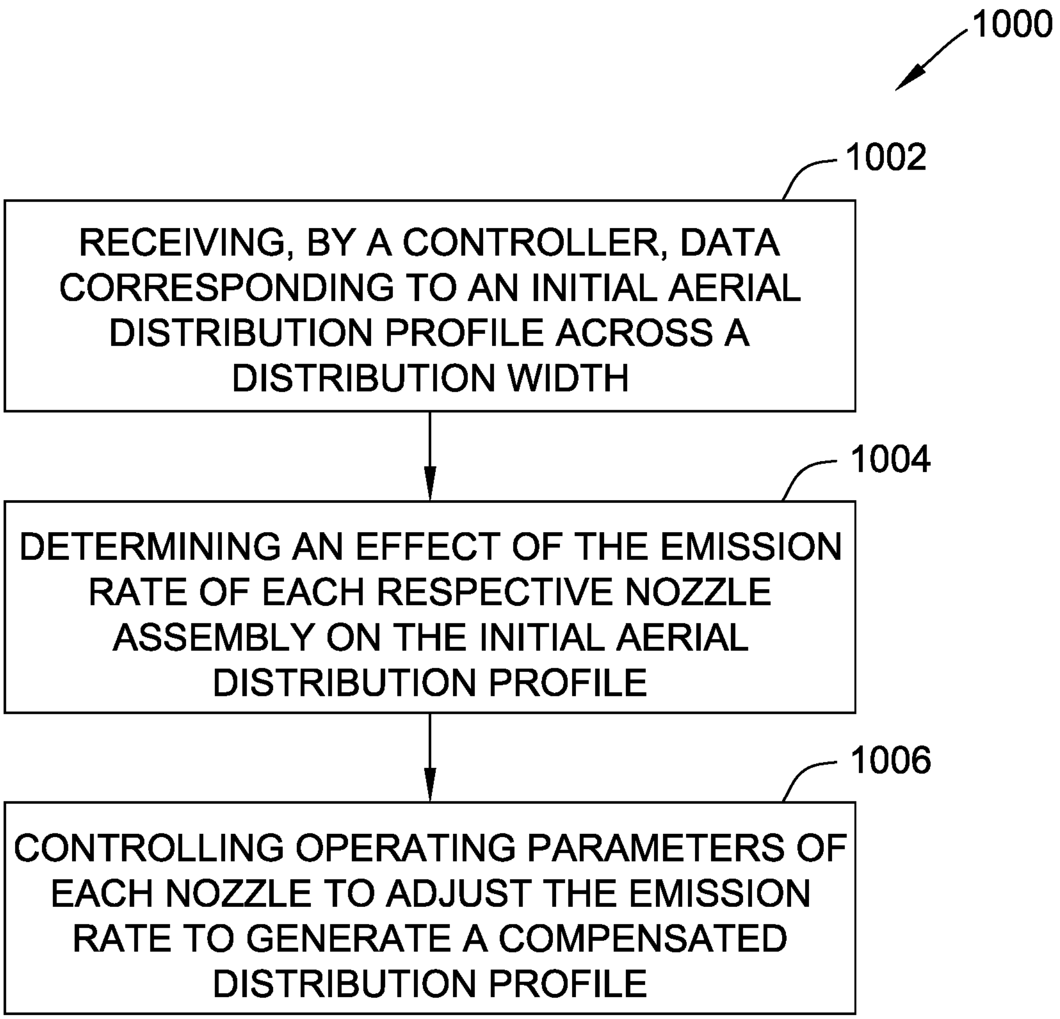
FIG. 10 is a flow chart of an example method for emitting the fluid from the fluid dispersal system shown in FIG. 1.

FIG. 10 is a flow chart of an example method 1000 for emitting fluid, such as material 30, from fluid dispersal system 10 (shown in FIG. 1). In the example embodiment and with reference to FIGS. 1-10, method 1000 includes receiving 1002 data corresponding to a distribution of a fluid, such as material 30, across a distribution width. The received data includes initial aerial distribution profile 102. As described above, material 30 is emitted through a plurality of individually controlled nozzle assemblies 22 distributed across boom pipe 24. Controller 60 controls and/or regulates a flow rate of material 30 through each respective nozzle assembly 22 by adjusting or controlling one or more operating parameters of the respective nozzle assembly. In one embodiment, controller 60 receives the data corresponding to the fluid distribution profile, e.g., initial aerial distribution profile 102, including for example, generating the data using a predictive model programmed into controller 60. Alternatively, an offsite computing device (not shown) receives the data. In the exemplary embodiment, the initial aerial distribution profile 102 data is received from at least one of a string kit analysis and a spot card analysis. In another embodiment, the data is received from a predictive computer model such as AGDISP and FSCBG, as described herein and which may be included in controller 60. In still another embodiment, the initial aerial distribution profile 102 data may be received by a user manually entering the data based on, for example, and without limitation, an intuitive and/or historical data set.

In addition, method 1000 includes determining 1004 an effect of the emission rate of each respective nozzle assembly 22 on the distribution of the fluid across the distribution width. For example, and without limitation, in one embodiment, controller 60 may be configured to perform a calculation based on data corresponding to distribution profile 102, where one or more known operational constraints, for example, and without limitation, a nozzle assembly type, and aerial vehicle type, etc., are known. Such a calculation facilitates determining an effect of the emission rate of a respective nozzle assembly 22 has on distribution profile 102, and determining one or more operating parameters of each respective nozzle assembly 22 to facilitate increasing the uniformity of distribution profile 102. In an alternative embodiment, an offsite computing device may perform the calculation to determine the effect of the emission rate of each respective nozzle assembly 22.

Referring still to FIG. 10, method 1000 further includes controlling 1006 the operating parameter of each respective nozzle assembly 22 to adjust the emission rate to generate a compensated distribution profile, such as a distribution profile having increased fluid distribution uniformity as compared to initial aerial distribution profile 102. For example, as described herein, controller 60 may increase the timing, duration, duty cycle percentage, and/or pulse frequency of respective nozzle assemblies 22 positioned near the right side of aerial vehicle 12 to facilitate increasing an emission rate of the nozzle assemblies corresponding to valley 108 of aerial distribution profile 102, and/or decrease the timing, duration, duty cycle percentage, and/or pulse frequency of nozzle assemblies 22 positioned near the left side of aerial vehicle 12 to facilitate decreasing the emission rate of the nozzle assemblies corresponding to peak 106. Furthermore, a physical position of each nozzle assembly 22 and/or a number of nozzle assemblies 22 may be adjusted to further facilitate increasing the uniformity of aerial distribution profile 102. By adjusting the position, and adjusting the one or more operating parameters of each nozzle assembly 22 to control their respective emission rates, controller 60 may further regulate the uniformity of the generated compensated distribution profile.

In embodiments where an offsite computing device determines the effect of the emission rate of the respective nozzle assemblies 22 and the one or more operating parameters of each respective nozzle assembly 22, the operating parameters may be transmitted to controller 60. For example, and without limitation, in one embodiment, a user may input the operating parameters into controller 60 using, for example, a portable computing device. Alternatively, the offsite computing device may transmit the operating parameters to controller 60 via wired or wireless technology including, but not limited to, radio or infrared frequencies using any communication protocol that enables fluid dispersal system 10 to function as described herein.

In one embodiment, the coefficient of variation (CV) of the received data corresponding to initial aerial distribution profile 102 is determined by, for example, controller 60 or an offsite computing device. Furthermore, in such an embodiment, the operating parameters of each respective nozzle assembly 22 may be adjusted to facilitate reducing the CV of the distribution profile across the distribution width. Moreover, in one embodiment, the operating parameters of each respective nozzle assembly 22 may be adjusted to facilitate increasing the effective swath width 104.

In one example embodiment, controlling 1006 the operating parameter of each respective nozzle assembly 22 includes presetting the operating parameter prior to dispersing material 30. For example, controller 60 and/or an offsite computing device may determine one or more operating parameters for each respective nozzle assembly 22 to generate a compensated distribution profile having increased fluid distribution uniformity as compared to the initial aerial distribution profile 102. The one or more operating parameters may be preset in controller 60. Alternatively, controller 60 may adjust one or more operating parameters of one or more nozzle assemblies in real-time, based in part on information received from position device 62 and/or atmospheric data device 64. For example, controller 60 may adjust operating parameters of nozzle assemblies 22 when fluid dispersal 10 changes directions and/or begins a new pass. Such adjustments may include preset operating parameters and/or real-time adjustments. As used herein, the term "real-time" includes at least one of the times of occurrence of the associated events, the time of measurement and collection of data, the time to process the data, and the time of a system response to the events and the environment. In the embodiments described herein, these activities and events occur substantially instantaneously. Position device 62 may provide ground speed data of aerial vehicle 12 and atmospheric data device 64 may provide at least one of a wind speed and a wind direction.

FIG. 11 is a flow chart of an example method 1100 for emitting fluid, such as material 30, from fluid dispersal system 10 (shown in FIG. 1). In the example embodiment, as aerial vehicle 12 flies, the air velocity relative to aerial vehicle 12 differs at different positions around the vehicle. For example, and without limitation, in an area directly under the wings, the relative air velocity is substantially similar to the vehicle air speed of aerial vehicle 12. However, the relative air velocity in the prop wash, directly behind propeller 38, is greater than the relative air velocity under the wings. Similarly, as described herein, the ends of the wings introduce air vortices (i.e., wing tip vortices), which create relative air velocities greater than the velocity under the wings. This variance in relative air velocities contributes to the non-uniform aerial distribution profile 102 (shown in FIG. 9).

Moreover, in an embodiment using rotary aerial vehicle 13, the relative air velocity at each respective nozzle assembly 22 is primarily downward, caused by the downwash of the rotor blades of rotary aerial vehicle 13. The relative air velocity differs at different distances away from a center of rotary aerial vehicle 13. For example, and without limitation, in an area directly under the fuselage, the downwash may be blocked from nozzles assemblies 22, whereas the downward air velocity increases at each nozzle assembly 22 the further away it is from the center of rotary aerial vehicle 13. This variance in relative air velocities contributes to a non-uniform aerial distribution profile, such as distribution profile 102 (shown in FIG. 9).

A droplet size of material 30 emitted from nozzle assemblies 22 is dependent upon, at least in part, a differential fluid velocity of the emitted material 30 from nozzle assemblies 22 and the relative air speed of the air stream the material is emitted into. For example, and without limitation, when nozzle assemblies 22 are operating, a turbulent stream of material 30 exits nozzle head 54 and impacts the air stream flowing past and surrounding nozzle head 54. The shear force of the air stream on the stream of material 30 causes the material 30 to break apart into a plurality of droplets. One of the primary factors affecting the shear force and the resulting droplet size is the differential velocity between the stream of material 30 and the outside stream of air.

When the air is moving relative to nozzle assemblies 22, such as when aerial vehicle 12 is in forward flight and/or the rotor of rotary aerial vehicle 13 is producing a downwash air stream, the shear force on the stream of material 30 is related to the difference between the air velocity and the fluid velocity of the material 30 exiting nozzle assemblies 22. For example, and without limitation, when aerial vehicle 12 is traveling forward at 130 miles per hour (mph) (58 meters per second (m/s)), and material 30 is being emitting rearward from nozzle assemblies 22 with a fluid velocity of 50 mph (22 m/s), the differential velocity is 80 mph (36 m/s). However, as discussed above, the relative air velocities differ at different positions around the aerial vehicles, and as such, at each respective nozzle assembly 22. Accordingly, the fluid velocity of the stream of material 30 emitted by each respective nozzle assembly 22 may vary across each respective nozzle assembly 22 to maintain a desired droplet size of material 30.

In another embodiment, rotary aerial vehicle 13 produces a downwash air stream with a varying velocity. For example, and without limitation, as rotary aerial vehicle 13 hover, descends, or ascends, the downwash velocity changes. In addition, as described above, the down wash velocity varies along a length of the rotor from the center of rotary aerial vehicle 13. It is noted that each nozzle assembly 22 may also experience a velocity pulse as each rotor blade of rotary aerial vehicle 13 passes over the nozzle assembly. That is, as each blade passes over the nozzle assembly 22, the blade causes a pulse of increased air speed. The shear force on the stream of material 30 is related to the difference between the downwash air velocity and the fluid velocity exiting nozzle assemblies 22. As discussed above, the relative air velocities differ at different positions along the boom pipe 24, the different flight aspects of rotary aerial vehicle 13, and whether a blade is overhead, and as such, at each respective nozzle assembly 22. Accordingly, the fluid velocity of the stream of material 30 emitted by each respective nozzle assembly 22 may vary across each respective nozzle assembly 22, and due to the velocity pulses, may vary within a respective nozzle assembly 22, to maintain a desired droplet size of material 30. In addition, the pulse frequency of each nozzle assembly 22 may be adjusted to be synchronous with rotation of the rotor blades. As a result, the material 30 may be distributed in a more uniform distribution profile.

In the example embodiment, and with reference to FIGS. 1-9 and 11, method 1100 includes emitting 1102 a fluid, such as material 30, from the plurality of individually controlled nozzle assemblies 22 distributed across boom pipe 24. As described herein, the droplet size of material 30 emitted from each respective nozzle assembly 22 corresponds to the differential fluid velocity of the emitted material 30 and an air stream the fluid is emitted into. In the example embodiment, aerial vehicle 12 flies at a substantially constant air speed when dispensing material 30 from fluid dispersal system 10 onto the crops and/or surface of the ground. In embodiments using rotary aerial vehicle 13, the aerial vehicle flies at a substantially constant height, such that the downwash velocity is generally constant. As such, operating pump assembly 18 is configured to pressurize material 30 to a pressure sufficient to produce a desired droplet size of material 30 at each of nozzle assemblies 22. For example, and without limitation, pump assembly 18 may be a high pressure pump capable of pressurizing material 30 to pressures in the range between about 100 pounds per square inch (psi) and about 400 psi to generate a sufficient fluid velocity across nozzle assemblies 22. However, because the relative air speed is faster at some nozzle assemblies 22 than at others, each nozzle assembly may be configured to supply material 30 at varying pressures to each nozzle assembly 22 to generate the desired fluid velocity.

Referring back to FIG. 5, in one embodiment, one or more nozzle assemblies 22 includes a pre-orifice 68 configured to restrict the flow of material 30 from the nozzle. As a result, pre-orifice 68 facilitates reducing a pressure, and therefore the velocity, of material 30 exiting nozzle assembly 22. It is appreciated that pre-orifice 68 can be sized and shaped to provide a desired pressure drop, such that each respective nozzle assembly 22 can be configured for a predetermined pressure drop equal to or different from each other nozzle assembly 22.

In another embodiment, one or more pressure regulators 66 are coupled to boom pipe 24 and configured to adjust a pressure of material 30 through selected portions of boom pipe 24. Alternatively, in other embodiments, actuator 50 of nozzle assembly 22 is configured to provide simultaneous control of instantaneous pressure drop across and cyclic durations of fluid flow through nozzle assembly 22. For example, in one embodiment, an operating parameter of each valve assembly 46 is controlled or adjusted to vary a pressure of material 30 across nozzle assembly 22. In particular, actuator 50 may be configured to be pulsed by controller 60 such that the cyclic durations control the average flowrate through nozzle assembly 22. Additionally, the pressure drop across nozzle assembly 22 may be controlled during each pulse of actuator 50 by regulating the position to which the actuator is moved relative to the valve inlet and/or the valve outlet (not shown). For instance, the displacement of actuator 50 may be regulated by controller 60 such that nozzle assembly 22 is partially opened during each pulse. By regulating the distance between actuator 50 and the valve inlet for each pulse, the pressure drop across nozzle assembly 22 may be accurately controlled. In one embodiment, the distance between actuator 50 and the valve inlet for each pulse of the actuator can be accurately controlled to vary the pressure drop across nozzle assembly 22, and therefore to vary the instantaneous fluid velocity, to synchronize with the downwash velocity pulses produced by rotary aerial vehicle 13.

Referring back to FIG. 11, in the example embodiment, method 1100 further includes receiving 1104, for example at controller 60, an input associated with a desired droplet size of the fluid, such as material 30, emitted from each respective nozzle assembly 22. The input may include, for example and without limitation, a user-specified droplet size, a user-specified desired operating pressure, a size of nozzle head 54, and/or a type of nozzle head 54. Furthermore, method 1100 includes determining 1106 a differential fluid velocity for each respective nozzle assembly 22 based on the desired droplet size of material 30. As described herein, in some embodiments, control system 58 includes a respective atmospheric data device 64 corresponding to a position of each respective nozzle assembly 22. As such, controller 60 may receive air speed data from each atmospheric data device 64, where the respective air speed data is indicative of the air speed at a respective nozzle assembly 22. Moreover, method 1100 includes regulating 1108 the velocity of material 30 through each respective nozzle assembly 22 to produce the determined differential fluid velocity from each respective nozzle assembly 22. As described herein, the differential fluid velocity is a relative difference between the relative air speed of the respective nozzle assembly 22 and the fluid velocity of material 30 exiting the respective nozzle assembly 22. It is appreciated that the pressure of pressurized material 30 affects the fluid velocity of material 30 through nozzle assembly 22. For example, as the pressure of material 30 is increased, the fluid velocity is increased. In addition, controller 60 can change the fluid velocity of material 30 through each nozzle assembly 22 to control the droplet size. For example, controller 60 can change the fluid velocity of material 30 through any of nozzle assemblies 22 to accommodate drift, i.e., controller 60 can increase or decrease the droplet size to decrease or increase the drift of material 30. It is noted that controller 60, while regulating the velocity of material 30 through each respective nozzle assembly 22, can also regulate the emission rate of each nozzle assembly 22 without changing or affect the velocity. As such, controller 60 can change the overall application rate of material 30 by fluid dispersal system 10 without changing droplet size.

Figure 12:
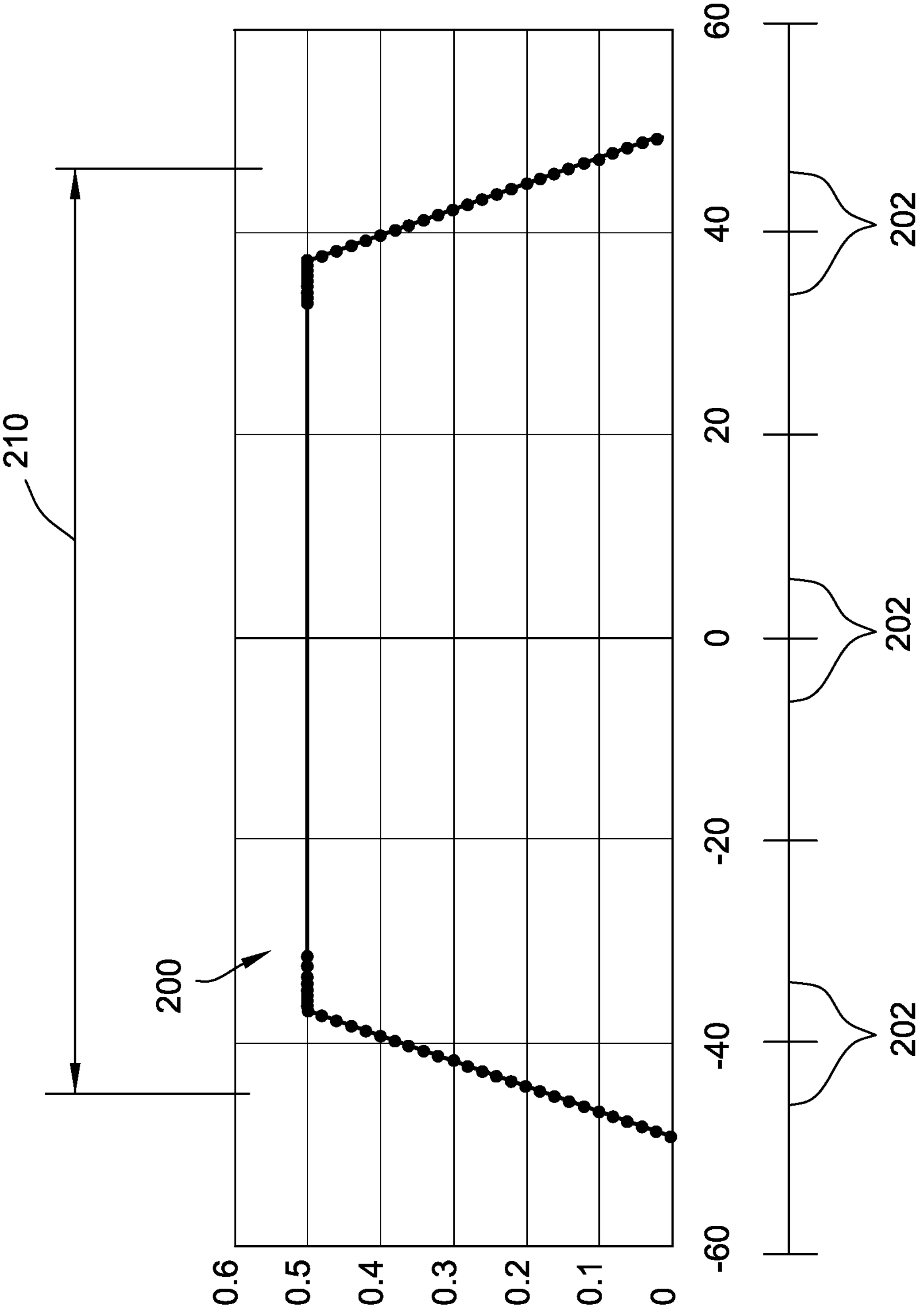
FIG. 12 is a graph of a desired distribution profile of a fluid dispersed from the aerial vehicle shown in FIG. 1.
Figure 18:
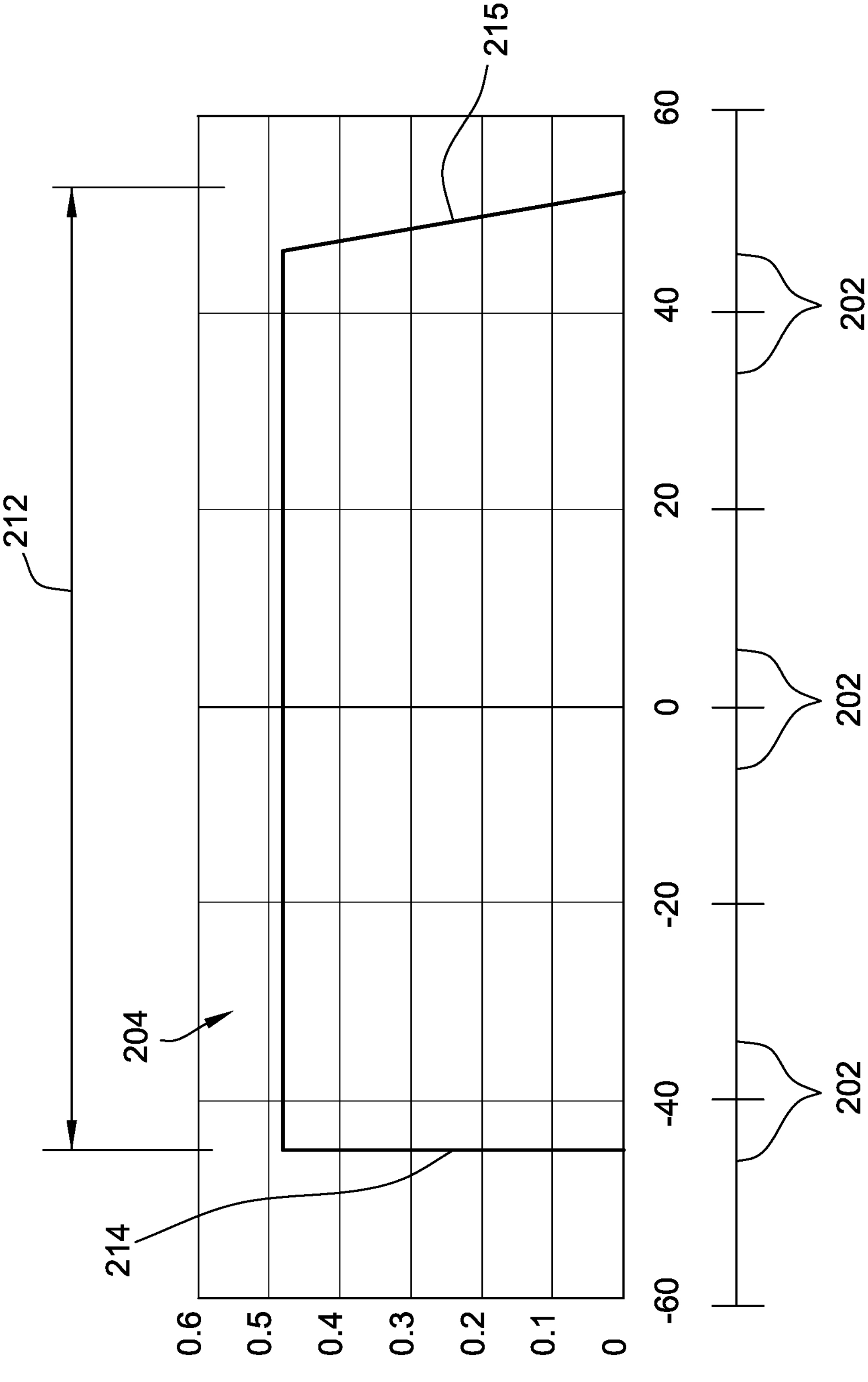
FIG. 18 is a graph of a desired distribution profile of a fluid dispersed from the aerial vehicle shown in FIG. 1, the distribution profile having a vertical edge.
Figure 19:
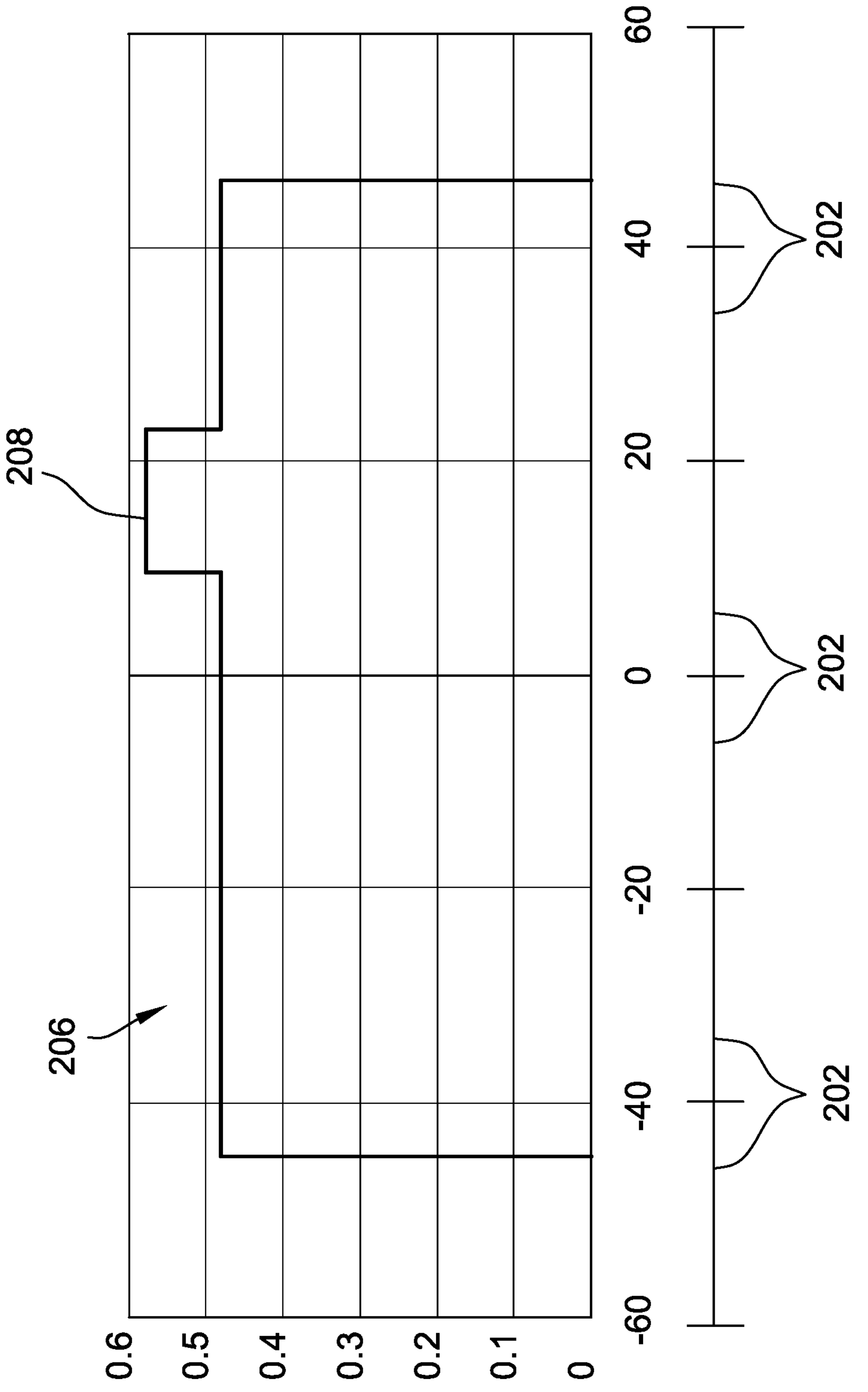
FIG. 19 is a graph of a desired distribution profile of a fluid dispersed from the aerial vehicle shown in FIG. 1, the distribution profile including a step.

As noted above, in some embodiments, one or more operating characteristics of a fluid dispersal system may be determined based on an optimized or desired aerial distribution profile in an "iterative" or "backwards" modeling process. FIG. 12 is a graph of an example desired distribution profile 200 of a fluid, such as material 30, dispersed from aerial vehicle 12 (shown in FIG. 1). FIG. 18 is a graph of an example desired distribution profile 204 having a vertical edge. FIG. 19 is a graph of an example desired distribution profile 206 including a step 208. In some embodiments, controller 60 is configured to determine emission rates from nozzle assemblies 22 (shown in FIGS. 1-3) and/or operating parameters of fluid dispersal system 10 (shown in FIG. 1) based on one of the desired distribution profiles 200, 204, 206. In some embodiments, one or more of distribution profiles 200, 204, 206 may be input or pre-loaded into controller 60. Additionally or alternatively, in some embodiments, controller 60 is configured to determine a desired or target distribution profile, such as distribution profiles 200, 204, 206, of fluid dispersed from aerial vehicle 12 based on user inputs (e.g., target application rate), and real-time conditions, such as system conditions, field conditions, and/or environmental conditions existing during application. Distribution profiles 200, 204, 206 may be provided using different operating characteristics. For example, each of distribution profiles 200, 204, 206 may be provided using more than one application rate. Accordingly, controller 60 may operate nozzle assemblies 22 (shown in FIGS. 1-3) to provide a desired distribution profile 200, 204, 206 and to provide a desired application rate.

In the illustrated embodiment, distribution profile 200 is substantially uniform across a middle portion and is tapered on the edges. Accordingly, distribution profile 200 has a trapezoidal shape. The tapered or angled edges of distribution profile 200 allow adjacent swath widths to overlap and reduce the likelihood that sections along an edge of the swath width will be missed. Therefore, distribution profile 200 may be desirable for a middle portion of a field. A distribution width 210 is measured between midpoints of the tapered edge portions. Distribution profile 204 is substantially uniform across a distribution width 212 and represents an ideal distribution profile. Distribution profile 204 has a vertical edge 214 and a tapered edge 215. Therefore, distribution profile 204 may be used for an edge or boundary of a field. Distribution width 212 is measured from vertical edge 214 and a midpoint of tapered edge 215. In other embodiments, distribution profiles 200, 204, 206 may vary across the distribution width to accommodate different distribution patterns and/or varying application requirements for target areas of fluid dispersal system 10.

In some embodiments, distribution width 210 is pre-set in controller 60. In further embodiments, distribution width 210 is at least partially determined based on operating characteristics of the system such as a desired number of passes. In other embodiments, the profile width is determined in real-time based on conditions such as wind speed and atmospheric data.

In some embodiments, controller 60 is configured to determine operating parameters of individual nozzle assemblies 22 (i.e., for valve assemblies 46 included in nozzle assemblies 22) or sets of nozzle assemblies and control nozzle assemblies 22 based on at least one of desired distribution profiles 200, 204, 206. For example, controller 60 identifies sections 202 of distribution profile 200 and relates the sections to nozzle assemblies 22. Controller 60 then determines the required volumetric flow for each nozzle assembly 22 or set of nozzle assemblies based on desired distribution profile 200. Based on the determined volumetric flow, one or more operating parameters may be determined to control nozzle assemblies 22. In some embodiments, controller 60 is configured to determine operating parameters and control individual nozzle assemblies 22 based on at least one of desired distribution profiles 200, 204, 206 such that fluid is applied to a crop or surface according to desired distribution profile 200. In other embodiments, desired distribution profile 200 may be used to determine any characteristics and/or operating parameters that enable fluid dispersal system 10 to operate as described herein.

In the example embodiment, aerial distribution profile 200 is divided into a plurality of equal sections 202. Sections 202 may be any suitable dimension. For example, in some embodiments, sections 202 are 10 ft. or 1 ft. sections. In other embodiments, at least some sections 202 may be different sizes. In the example embodiment, desired distribution profile 200 shows a desired coverage for each section 202. In the illustrated embodiment, at least two sections 202 receive an equal amount of material 30. In other embodiments, one or more sections 202 may receive more or less material.

Figure 13:
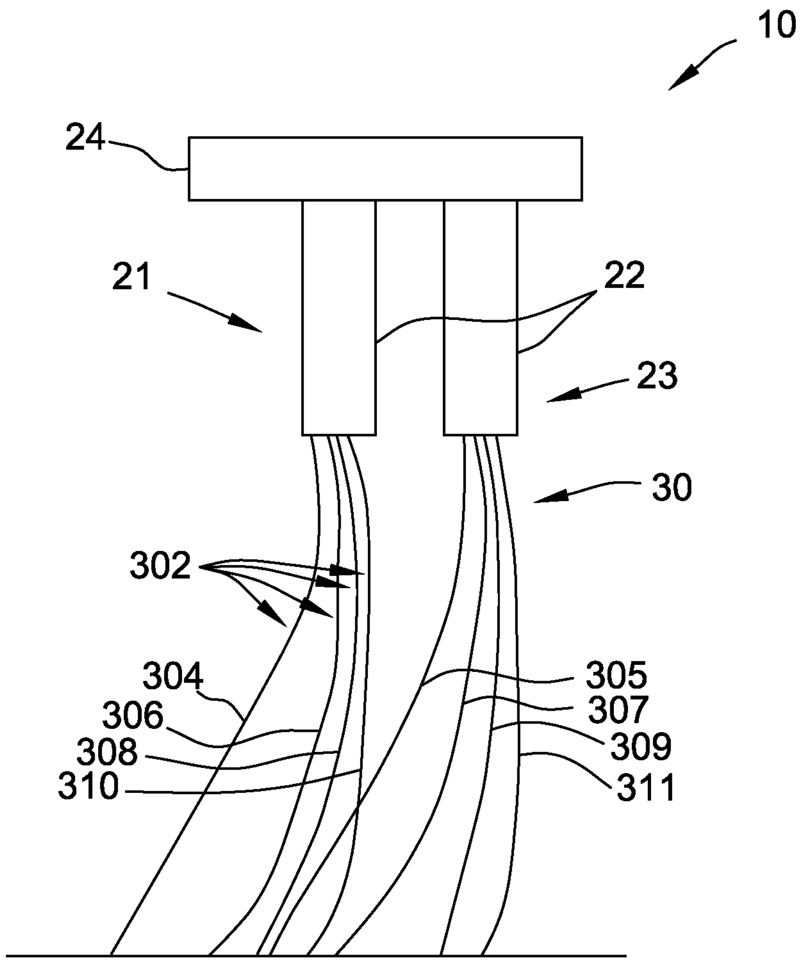
FIG. 13 is a schematic illustration of a fluid emitted from nozzle assemblies of the fluid dispersal system shown in FIG. 1.

FIG. 13 is a schematic illustration of fluid, such as material 30, emitted from nozzle assemblies 22 of fluid dispersal system 10. In the example embodiment, material 30 emitted from nozzle assemblies 22 is aerosolized into a plurality of droplets (e.g. by nozzle head 54), and each droplet follows one of a plurality of trajectories 302. Trajectories 302 of droplets depend on characteristics of material 30 and fluid dispersal system 10. For example, the droplet size of material 30 as material exits nozzle assemblies 22 affects its trajectory 302. More specifically, droplets having a smaller size will drift farther (i.e., trajectory 302 will be more curved) than droplets having a larger size. Accordingly, material 30 may be sorted into groups based on characteristics such as droplet size such that the trajectory of material 30 in each group is within a specified deviation. In other embodiments, material 30 may be grouped based on any characteristics.

In the example embodiment, material 30 emitted from a first nozzle assembly 21 is sorted into a first group 304, a second group 306, a third group 308, and a fourth group 310. Material 30 emitted from a second nozzle assembly 23 is sorted into a fifth group 305, a sixth group 307, an seventh group 309, and an eighth group 311. In the example embodiment, material 30 emitted from each nozzle assembly 22 along boom pipe 24 is sorted into groups 304, 305, 306, 307, 308, 309, 310, and 311 and not just material 30 emitted from the two nozzle assemblies 21, 23 shown in FIG. 13. Groups 304, 305, 306, 307, 308, 309, 310, and 311 each include material 30 having droplet sizes within a specified range. Material 30 emitted from each nozzle may be divided into any number of droplet size spectrums. In some embodiments, material 30 emitted from first nozzle assembly 21 and second nozzle assembly 23 are divided into groups including the same ranges of droplet sizes. For example, first group 304 may include the same range of droplet sizes as fifth group 305. In other embodiments, material 30 may be grouped in any manner that enables fluid dispersal system 10 to operate as described herein.

Trajectories 302 indicate the path of material 30 having a designated droplet size from respective nozzle assemblies 22 to a surface. Accordingly, trajectories 302 may be used to relate respective nozzle assemblies 22 (shown in FIG. 1) to sections 202 of aerial distribution profile 200. For example, controller 60 may determine where material 30 having a specified droplet size may be distributed from a specific nozzle assembly 22 based on trajectories 302.

Figure 14:
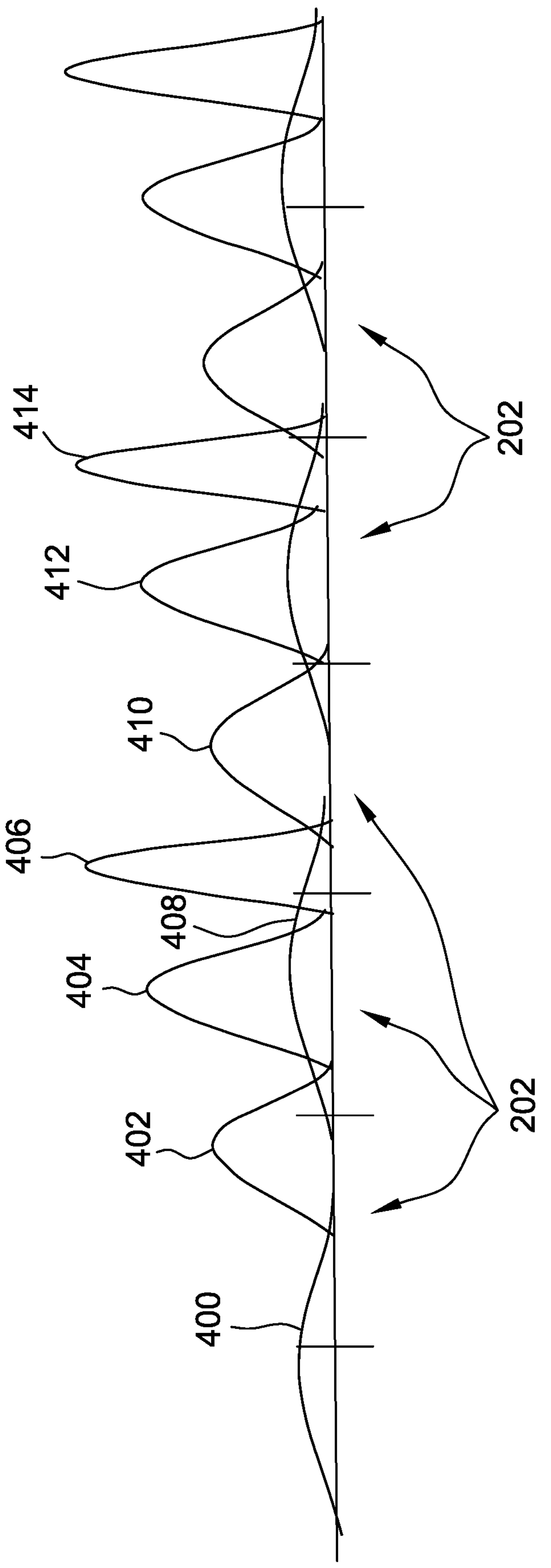
FIG. 14 is a graph of distribution curves of a fluid emitted from the nozzle assemblies shown in FIG. 11.

FIG. 14 is a graph of distribution profiles of fluid emitted from nozzle assemblies 22 (shown in FIG. 1). FIG. 14 includes a first curve 400, a second curve 402, a third curve 404, a fourth curve 406, a fifth curve 408, a sixth curve 410, a seventh curve 412, and an eighth curve 414. First curve 400, second curve 402, third curve 404, fourth curve 406, fifth curve 408, sixth curve 410, seventh curve 412, and eighth curve 414 represent portions of aerial distribution profiles 102, 200 of nozzle assemblies 22 separated based on a characteristic such as droplet size. First curve 400 represents material 30 emitted from first nozzle assembly 21 (shown in FIG. 13) having a first range of droplet sizes. Second curve 402 represents material 30 emitted from first nozzle assembly (shown in FIG. 13) having a second range of droplet sizes. Third curve 404 represents material 30 emitted from first nozzle assembly 21 (shown in FIG. 13) having a third range of droplet sizes. Fourth curve 406 represents material emitted from first nozzle assembly 21 (shown in FIG. 13) having a fourth range of droplet sizes. Fifth curve 408 represents material 30 emitted from second nozzle assembly 23 (shown in FIG. 13) having a fifth range of droplet sizes. Sixth curve 410 represents material 30 emitted from second nozzle assembly 23 (shown in FIG. 13) having a sixth range of droplet sizes. Seventh curve 412 represents material 30 emitted from second nozzle assembly 23 (shown in FIG. 13) having a seventh range of droplet sizes. Eighth curve 414 represents material emitted from second nozzle assembly 23 (shown in FIG. 13) having an eighth range of droplet sizes. In some embodiments, individual distribution profiles may be superposed to generate one or more cumulative distribution profiles.

First curve 400, second curve 402, third curve 404, fourth curve 406, fifth curve 408, sixth curve 410, seventh curve 412, and eighth curve 414 show material distributed from respective nozzle assemblies 21, 23 (shown in FIG. 13) to sections 202 of aerial distribution profile 200 (shown in FIG. 12). Accordingly, trajectories 302 (shown in FIG. 13) and curves 400, 402, 404, 406, 408, 410, 412, and 414 allow portions of desired aerial distribution profile 200 (shown in FIG. 12) to be related to individual nozzle assemblies 22 (shown in FIG. 1). For example, the deposition of the material 30 that relates to each nozzle assembly 22 may be determined using method 1400 (shown in FIGS. 17A and 17B). Moreover, the required emission rate of material 30 from each nozzle assembly 22 (shown in FIG. 1) for sections 202 of desired distribution profile 200 may be determined based on the relationship between desired aerial distribution profile 200 and nozzle assemblies 22.

Figure 15:
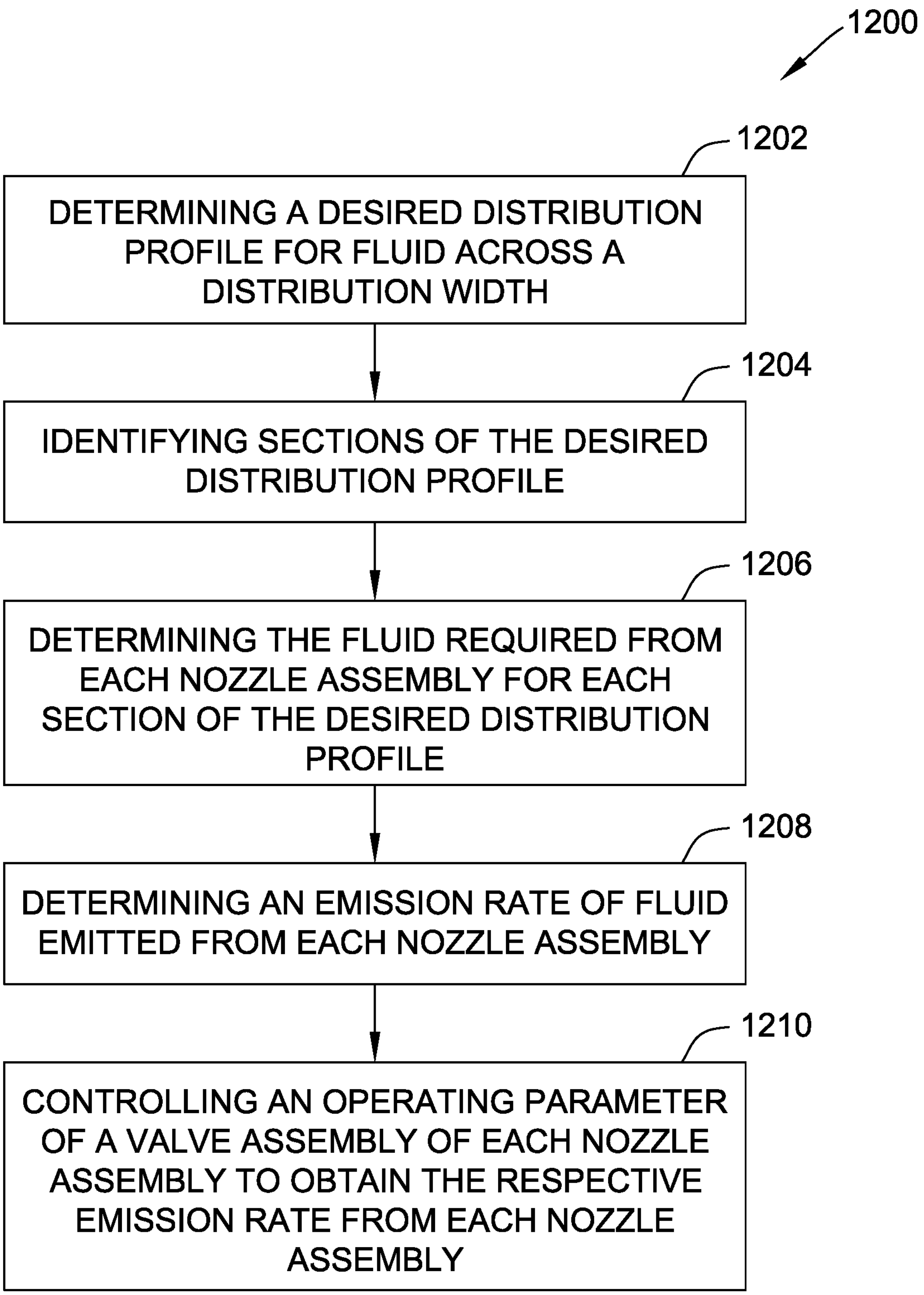
FIG. 15 is a flow chart of an example method for emitting a fluid from the fluid dispersal system shown in FIG. 1.

FIG. 15 is a flow chart of an example method 1200 for emitting fluid, such as material 30, from fluid dispersal system 10 (shown in FIG. 1). In the example embodiment and with reference to FIGS. 1-9 and 12-15, method 1200 includes determining 1202 a desired distribution profile 200 for material 30 across a distribution width. In some embodiments, controller 60 receives data including distribution profile 200. In one embodiment, distribution profile 200 is determined 1202 using a predictive model programmed into controller 60. Alternatively, an offsite computing device (not shown) receives the data. In the example embodiment, aerial distribution profile 200 data is received from a predictive computer model such as AGDISP and FSCBG, as described herein and which may be included in controller 60. In still another embodiment, aerial distribution profile 200 data may be received by a user manually entering the data based on, for example, and without limitation, an optimized distribution profile.

In addition, method 1200 includes identifying 1204 sections 202 of aerial distribution profile 200. In the example embodiment, aerial distribution profile 200 is divided into equal sections 202.

The method 1200 further includes determining 1206 the volumetric flow of material 30 required from each nozzle assembly 22 for each section 202 of the aerial distribution profile 200. For example, in some embodiments, the aerial distribution profile 200 is sorted into groups 304, 305, 306, 307, 308, 309, 310, and 311 based on a characteristic of material 30 emitted from nozzle assemblies 22, such as droplet size, and the groups are related to specific nozzle assemblies based on trajectories 302 of the material. The amount of material in each group 304, 305, 306, 307, 308, 309, 310, and 311 indicates how much volumetric flow of material 30 is required from a respective nozzle assembly 21, 23.

Also, method 1200 includes determining 1208 an emission rate of material 30 from each nozzle assembly 22 required to obtain the determined volumetric flow of material 30. For example, and without limitation, in one embodiment, controller 60 may be configured to perform a calculation based on data corresponding to distribution profile 200, where one or more known operational constraints, for example, and without limitation, a nozzle assembly type, and aerial vehicle type, etc., are known. Such a calculation facilitates determining the emission rate of a respective nozzle assembly 22 that is required to provide the determined material 30 for each section 202 of aerial distribution profile 200. In an alternative embodiment, an offsite computing device may perform the calculation to determine the emission rate of each respective nozzle assembly 22.

Referring still to FIG. 15, method 1200 further includes controlling 1210 the operating parameter of each respective nozzle assembly 22 to obtain the respective emission rate from each nozzle assembly 22. For example, as described herein, controller 60 may increase/decrease the timing, duration, duty cycle percentage, and/or pulse frequency of respective nozzle assemblies 22. Furthermore, in some embodiments, a physical position of each nozzle assembly 22 and/or a number of nozzle assemblies 22 may be adjusted to provide aerial distribution profile 200. By adjusting the position, and adjusting the one or more operating parameters of each nozzle assembly 22 to control their respective emission rates, controller 60 may further regulate the uniformity of the generated distribution profile.

In embodiments where an offsite computing device determines the emission rate of the respective nozzle assemblies 22 and the one or more operating parameters of each respective nozzle assembly 22, the operating parameters may be transmitted to controller 60. For example, and without limitation, in one embodiment, a user may input the operating parameters into controller 60 using, for example, a portable computing device. Alternatively, the offsite computing device may transmit the operating parameters to controller 60 via wired or wireless technology including, but not limited to, radio or infrared frequencies using any communication protocol that enables fluid dispersal system 10 to function as described herein.

In one embodiment, during operation, data including an actual aerial distribution profile 102 is received and compared to desired distribution profile 200. Accordingly, controller 60 may control fluid dispersal system 10 based on aerial distribution profile 102 and/or desired distribution profile 200. For example, the coefficient of variation (CV) of the received data corresponding to aerial distribution profile 102 may be determined by, for example, controller 60 or an offsite computing device. Furthermore, in such an embodiment, the operating parameters of each respective nozzle assembly 22 may be adjusted to facilitate reducing the CV of the distribution profile across the distribution width. Moreover, in one embodiment, the operating parameters of each respective nozzle assembly 22 may be adjusted to facilitate increasing the effective swath width 104.

In one example embodiment, controlling 1210 the operating parameter of each respective nozzle assembly 22 includes presetting the operating parameter prior to dispersing material 30. For example, controller 60 and/or an offsite computing device may determine one or more operating parameters for each respective nozzle assembly 22 to generate the aerial distribution profile 102. The one or more operating parameters may be preset in controller 60. Alternatively, controller 60 may adjust one or more operating parameters of one or more nozzle assemblies in real-time, based in part on information received from position device 62 and/or atmospheric data device 64. As used herein, the term "real-time" includes at least one of the times of occurrence of the associated events, the time of measurement and collection of data, the time to process the data, and the time of a system response to the events and the environment. In the embodiments described herein, these activities and events occur substantially instantaneously. Position device 62 may provide ground speed data of aerial vehicle 12 and atmospheric data device 64 may provide at least one of a wind speed and a wind direction.

Figure 16A:
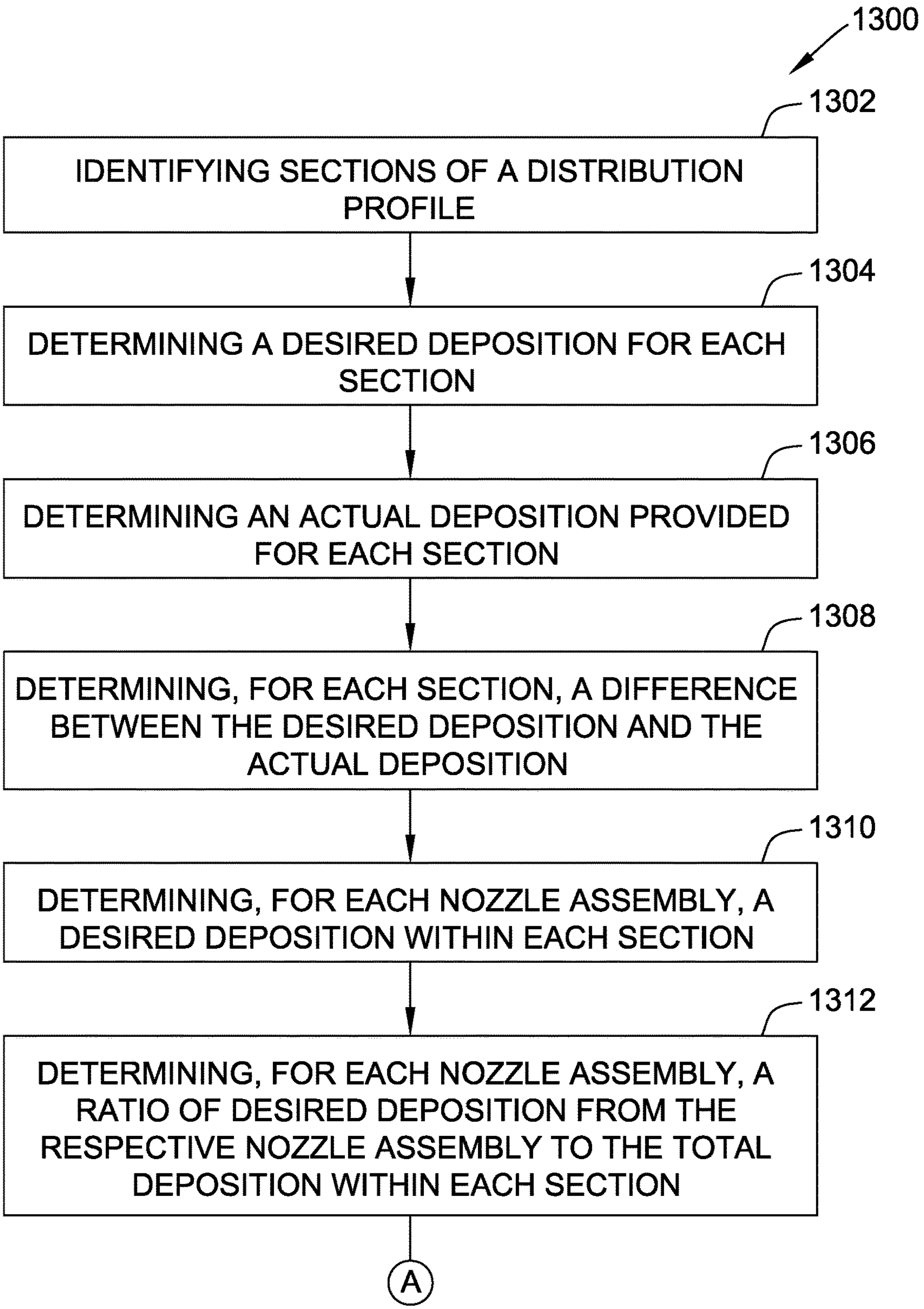
FIGS. 16A and 16B illustrate a flow chart of an example method for determining an emission rate of each nozzle assembly of the fluid dispersal system shown in FIG. 1.
Figure 16B:
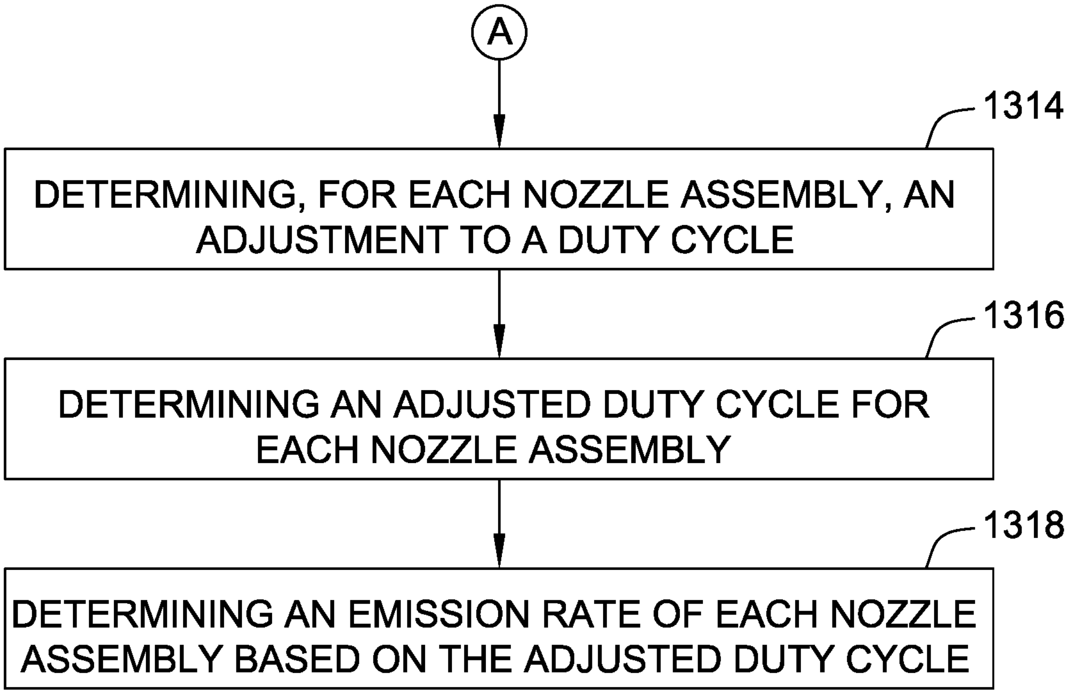

FIGS. 16A and 16B illustrate a flow chart of an example method 1300 for determining an emission rate of fluid, such as material 30, from each nozzle assembly 22 (shown in FIG. 1) of fluid dispersal system 10 (shown in FIG. 1). In the example embodiment and with reference to FIGS. 1-9, 12-14, 16A, and 16B, method 1300 includes identifying 1302 sections 202 of distribution profile 200. Method 1300 also includes determining 1304 a desired deposition for each section 202 and determining 1306 an actual deposition provided for each section 202. The desired deposition for each section 202 is the sum of the predicted depositions within the respective section 202 from multiple droplet sizes emitted by nozzle assemblies 22. For example, the desired deposition for each section 202 may be determined by calculating the area of distribution profile 200 in each section 202. The actual deposition may be determined using a pattern test and/or in any other suitable manner. Method 1300 further includes determining 1308, for each section, a difference between the desired deposition and the actual deposition. The difference between the desired deposition and the actual deposition provides a deposition error.

Method 1300 also includes determining 1310, for each nozzle assembly 22, a desired deposition within each section 202. The desired deposition may be determined 1310 using an iterative process. Method 1400 (shown in FIGS. 17A and 17B) provides an example process for determining 1310 the desired depositions within each section 202 for each nozzle assembly and also for determining total desired depositions in each section 202.

Method 1300 further includes determining 1312, for each nozzle assembly, a ratio of the desired deposition from the respective nozzle assembly 22 to the total deposition within each section 202. Specifically, the ratio may be determined by dividing the desired deposition from respective nozzle assembly 22 by the total deposition within each section 202. The ratio may be determined only for the nozzle assemblies 22 that have a deposition that is greater than zero in the respective section 202. The ratio provides a percentage of deposition from respective nozzle assembly 22.

Method 1300 further includes determining 1314, for each nozzle assembly 22, an adjustment to an operating parameter of nozzle assembly 22. The operating parameter may be a duty cycle of nozzle assembly 22. For example, the adjustment may be determined based on the error of the deposition and the ratio of the desired deposition from respective nozzle assembly 22 to the total deposition within each section 202. In addition, an incremental percentage may be used to incrementally correct the error through a number of iterations. For example, the incremental value may be 0.2, which would provide a 20% adjustment per iteration. In the example, determining 1314 includes multiplying the error of the deposition, the percentage of deposition for the respective nozzle assembly 22, and the incremental value to provide the adjustment. The adjustment may be multiplied by 100 to provide a percentage value.

Method 1300 also includes determining 1316 an adjusted operating value for each nozzle assembly 22. The adjusted operating value may be an adjusted duty cycle. Determining 1316 includes adding the determined adjustment to a stored value for the duty cycle. The adjusted duty cycle may be compared to a range of values and further adjusted based on the range. For example, the adjusted duty cycle may be set to 100 if the determined adjusted duty cycle is greater than 100. If the determined adjusted duty cycle is less than 0, then the adjusted duty cycle may be set to 0. In other embodiments, the duty cycle may be adjusted within other limits based on operating characteristics of nozzle assemblies 22.

Method 1300 further includes determining 1318 an emission rate of each nozzle assembly 22 based on the respective adjusted duty cycle. For example, the emission rate may be determined 1318 by multiplying an instantaneous fluid flow from each nozzle assembly 22 by the adjusted duty cycle and dividing by 100. The emission rate may be provided in units of gallons per minute (gpm). The instantaneous fluid flow from each nozzle assembly 22 may be determined based on characteristics of fluid dispersal system 10 such as fluid pressure and nozzle size. In addition, in some embodiments, an application rate of each nozzle assembly 22 is determined based on the emission rate of the respective nozzle assembly and the ground speed of fluid dispersal system 10.

Emission rates of material 30 from each nozzle assembly 22 may be determined using an iterative process. Accordingly, any of the steps in method 1300 may be repeated a desired number of iterations. For example, in some embodiments, method 1300 may be repeated for at least 100 iterations. In further embodiments, the number of iterations may depend on the determined deposition error. Specifically, the method 1300 may be repeated until the deposition error is below a desired value. In other embodiments, method 1300 may be performed any number of times including once without departing from some aspects of the disclosure.

Figure 17B:
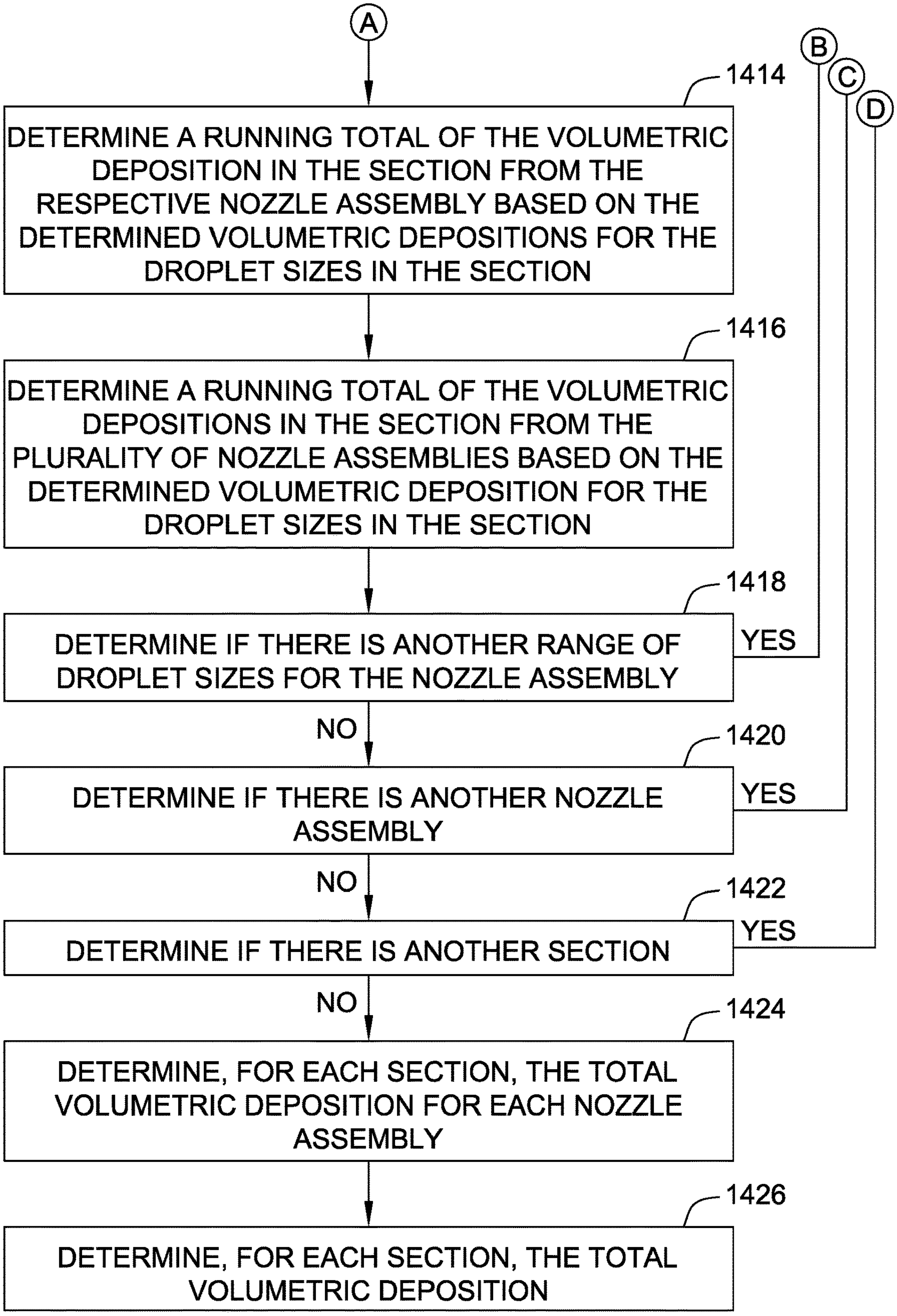

FIGS. 17A and 17B illustrate a flow chart of an example method 1400 for determining a deposition amount of fluid, such as material 30, emitted from the fluid dispersal system 10 (shown in FIG. 1). In the example embodiment and with reference to FIGS. 1-9, 12-14, 17A and 17B, method 1400 includes dividing 1402 distribution profile 200 into a plurality of sections 202 and identifying a section 202 of the plurality of sections 202. Method 1400 also includes identifying 1404 a nozzle assembly 22 of a plurality of nozzle assemblies 22 configured to emit fluid such as material 30 across distribution profile 200. Method 1400 further includes identifying 1408 a range of droplet sizes of the fluid emitted from nozzle assembly 22. Method 1400 also includes determining 1410 a distribution spread for the range of droplet sizes based on a position of the respective nozzle assembly 22. For example, a position of nozzle assembly 22 along boom pipe 24 may be related to an axis of distribution profile 200. The distribution spread for the range of droplet sizes can then be calculated based on the trajectory of the range of droplet sizes from either side of the position of nozzle assembly 22. In some embodiments, calculations to determine deposition totals for a range of droplet sizes in a section are only performed if the distribution spread of the respective range of droplet sizes overlaps the position of the section along the axis.

Method 1400 further includes determining 1412, for the range of droplet sizes, a calculated volumetric deposition in section 202 based on the distribution spread and the portion of fluid flow that is emitted from nozzle assembly 22 with droplet sizes within the range of droplet sizes. Method 1400 also includes determining 1414 a running total of the volumetric deposition in section 202 from the respective nozzle assembly 22 based on the determined volumetric depositions for the droplet sizes in section 202. Method 1400 further includes determining 1416 a running total of the volumetric depositions in section 202 from the plurality of nozzle assemblies 22 based on the determined volumetric deposition for the droplet sizes in the respective section 202. The running totals may be determined by adding the calculated volumetric deposition for each respective range of droplet sizes to a previously stored running total. The running totals may be set to zero or another determined value at the beginning of method 1400.

Method 1400 is an iterative process. Specifically, method 1400 includes nested iterations for each section 202, for each nozzle assembly 22 providing fluid to the each section 202, and each range of droplet sizes from each nozzle assembly 22 providing fluid to the each section 202. Accordingly, method 1400 includes determining 1418 if there is another range of droplet sizes for nozzle assembly 22 after determining 1414 a running total of the volumetric deposition in section 202 from the respective nozzle assembly 22 and determining 1416 a running total of the volumetric depositions in section 202 from the plurality of nozzle assemblies 22. If there is another range of droplet sizes, method 1400 returns to identifying 1408 a range of droplet sizes. If there is not another range of droplet sizes, method 1400 proceeds to determining 1420 if is there another nozzle assembly 22. If there is another nozzle assembly 22, method 1400 returns to identifying 1406 a nozzle assembly 22. If there is not another nozzle assembly, method 1400 proceeds to determining 1422 if there is another section 202. If there is another section 202, method 1400 returns to identifying 1404 a section 202. If there is not another section, the iterations for each section 202, each nozzle assembly 22 providing fluid to the each section 202, and each range of droplet sizes from each nozzle assembly 22 providing fluid to the each section 202 are complete.

In addition, method 1400 includes determining, for each section 202, the total volumetric deposition from each nozzle assembly 22. Specifically, the running total of the volumetric deposition in each section for each nozzle assembly is the total volumetric deposition for each nozzle assembly in the respective section when depositions from all ranges of droplet sizes for the nozzle assembly providing fluid to the respective section have been summed. Method 1400 further includes determining, for each section 202, the total volumetric deposition. Specifically, the running total of the volumetric deposition in each section is the total volumetric deposition for each section when depositions from all ranges of droplet sizes for all nozzle assemblies providing fluid to the respective section have been summed. In some embodiments, the total volumetric depositions are provided in percentages of an application rate. For example, the total volumetric depositions may be provided in terms of percentage gallons per square feet and/or percentage gallons per acre.

While, in some embodiments, the described methods and systems are used to handle a fluid that is applied to agricultural fields, such as an herbicide or a pesticide, the described methods and systems may be used for handling any type of fluids, not just fluids for use in the agricultural industry.

Embodiments of the methods and systems described herein may more efficiently apply materials, such as fluids, to surfaces compared to prior methods and systems. For example, the systems and methods described provide improved fluid application systems that increase the precision and operating efficiency of aerial application systems. More specifically, the embodiments described increase the uniformity of a distribution of fluid onto a surface and decrease a coefficient of variation of the fluid distribution. In some embodiments, the embodiments described provide systems that include individual control of electronically actuated valves connected to the manifold assembly.

In addition, the methods and systems reduce the time required to adjust application parameters such as emission rate and swath width of fluid dispersal systems. Moreover, embodiments allow for real-time adjustments and/or calculations during operation of the fluid dispersal systems because the systems do not necessarily require field measurements of an actual distribution profile.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. Moreover, the use of "top", "bottom", "above", "below" and variations of these terms is made for convenience, and does not require any particular orientation of the components.

As various changes could be made in the above without departing from the scope of the invention, it is intended that all matter contained in the above description and shown in the accompanying drawings shall be interpreted as illustrative and not in a limiting sense.

What is claimed is:

1. A method for emitting a fluid, said method comprising:

emitting the fluid from a plurality of individually controlled nozzle assemblies distributed across a manifold assembly coupled to an aerial vehicle configured to travel through the air at a vehicle air speed, the fluid emitted from each respective nozzle assembly having a droplet size based on a differential fluid velocity between a relative air speed of the respective nozzle assembly when the aerial vehicle is traveling through the air at the vehicle air speed and a velocity of the fluid exiting the respective nozzle assembly;

receiving, at a controller, an input associated with a desired droplet size of the fluid emitted from each respective nozzle assembly;

determining, by the controller, a target differential fluid velocity for each respective nozzle assembly based on the desired droplet size and the relative air speed of the respective nozzle assembly; and regulating, using the controller, the velocity of the fluid through each respective nozzle assembly to produce the target differential fluid velocity from each respective nozzle assembly.

2. The method in accordance with claim 1, wherein regulating the velocity of the fluid through each respective nozzle assembly comprises adjusting an upstream pressure of the fluid supplied to each respective nozzle assembly.

3. The method in accordance with claim 2, wherein adjusting the upstream pressure comprises controlling a pressure regulator coupled to the manifold assembly.

4. The method in accordance with claim 2, wherein adjusting the upstream pressure comprises increasing a pressure of the fluid supplied to each respective nozzle assembly using a high pressure pump assembly.

5. The method in accordance with claim 1, wherein regulating the velocity of the fluid through each respective nozzle assembly comprises regulating an extent to which a valve assembly of each respective nozzle assembly is opened.

6. The method in accordance with claim 1 further comprising coupling a pre-orifice to one or more of the plurality of individually controlled nozzle assemblies to adjust an upstream pressure of the fluid supplied to a spray nozzle of each respective nozzle assembly based on the determined target differential fluid velocity.

7. The method in accordance with claim 1, wherein regulating the velocity of the fluid through each respective nozzle assembly comprises controlling an operating parameter of a valve assembly of each respective nozzle assembly to adjust a flow rate of each respective nozzle assembly.

8. The method in accordance with claim 7, wherein controlling the operating parameter comprises controlling one or more of a timing, a duration, a pulse frequency, a coil current, a pilot pressure, and a duty cycle of each respective valve assembly.

9. The method in accordance with claim 1, further comprising receiving atmospheric data corresponding to at least one of wind speed, wind direction, air pressure, relative humidity, and ambient air temperature, wherein determining a target differential fluid velocity for each respective nozzle assembly based on the desired droplet size comprises determining the target differential fluid velocity for each respective nozzle assembly based on the desired droplet size and the atmospheric data.

10. The method in accordance with claim 9, wherein receiving atmospheric data comprises receiving air speed data from a respective atmospheric data device corresponding to a position of each respective nozzle assembly.

11. An aerial fluid dispersal system comprising:

a fluid reservoir configured to hold a quantity of fluid;

a manifold assembly in fluid communication with said fluid reservoir;

a fluid pump coupled in fluid communication with said fluid reservoir and said manifold assembly for generating a flow of pressurized fluid in said manifold assembly;

a plurality of individually controlled nozzle assemblies coupled to an aerial vehicle configured to travel through the air at a vehicle air speed and coupled in fluid communication with said manifold assembly, each respective nozzle assembly of said plurality of individually controlled nozzle assemblies configured to emit the pressurized fluid, the fluid emitted from each respective nozzle assembly having a droplet size based on a differential fluid velocity between a relative air speed of the respective nozzle assembly and a velocity of the fluid exiting the respective nozzle assembly; and a controller coupled to said fluid pump and said plurality of individually controlled nozzle assemblies, said controller configured to:

receive an input associated with a desired droplet size of the fluid emitted from each respective nozzle assembly;

determine a target differential fluid velocity for each respective nozzle assembly based on the desired droplet size and a relative air speed of the respective nozzle assembly; and regulate the velocity of the fluid through each respective nozzle assembly to produce the target differential fluid velocity from each respective nozzle assembly.

12. The aerial fluid dispersal system in accordance with claim 11, wherein the controller is configured to adjust an upstream pressure of the fluid supplied to each respective nozzle assembly to regulate the velocity of the fluid through each respective nozzle assembly.

13. The aerial fluid dispersal system in accordance with claim 12, wherein the controller is configured to control a pressure regulator coupled to the manifold assembly to adjust the upstream pressure.

14. The aerial fluid dispersal system in accordance with claim 12, wherein the controller is further configured to increase a pressure of the fluid supplied to each respective nozzle assembly using a high pressure pump assembly.

15. The aerial fluid dispersal system in accordance with claim 11, wherein the controller is configured to regulate an extent to which a valve assembly of each respective nozzle assembly is opened to regulate the velocity of the fluid through each respective nozzle assembly.

16. The aerial fluid dispersal system in accordance with claim 11 further comprising a pre-orifice coupled to one or more of the plurality of individually controlled nozzle assemblies and configured to adjust an upstream pressure of the fluid supplied to a spray nozzle of each respective nozzle assembly based on the target differential fluid velocity.

17. The aerial fluid dispersal system in accordance with claim 11, wherein the controller is further configured to control an operating parameter of a valve assembly of each respective nozzle assembly to adjust a flow rate of each respective nozzle assembly and regulate the velocity of the fluid through each respective nozzle assembly.

18. The aerial fluid dispersal system in accordance with claim 17, wherein the controller is configured to control the operating parameter by controlling one or more of a timing, a duration, a pulse frequency, a coil current, a pilot pressure, and a duty cycle of each respective valve assembly.

19. The aerial fluid dispersal system in accordance with claim 11, further comprising at least one atmospheric data device, wherein the controller is configured to:

receive atmospheric data from the atmospheric data device corresponding to at least one of air speed data, wind speed, wind direction, air pressure, relative humidity, and ambient air temperature; and determine the target differential fluid velocity for each respective nozzle assembly based on the desired droplet size and the atmospheric data.

20. The aerial fluid dispersal system in accordance with claim 19, further comprising a respective atmospheric data device corresponding to a position of each respective nozzle assembly, wherein the atmospheric data comprises air speed data indicative of the air speed at a respective nozzle assembly.

* * * * *